US008526484B2

(12) United States Patent
Sato

(10) Patent No.: US 8,526,484 B2
(45) Date of Patent: Sep. 3, 2013

(54) CONTENT REPRODUCTION APPARATUS, CONTENT RECEIVING APPARATUS, METHOD OF REPRODUCING CONTENT, PROGRAM, AND CONTENT REPRODUCTION SYSTEM

(75) Inventor: Katsuyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 835 days.

(21) Appl. No.: 12/702,520

(22) Filed: Feb. 9, 2010

(65) Prior Publication Data

US 2010/0220769 A1 Sep. 2, 2010

(30) Foreign Application Priority Data

Feb. 27, 2009 (JP) ................. 2009-047005

(51) Int. Cl.
*H04B 3/36* (2006.01)
(52) U.S. Cl.
USPC ........... 375/211; 375/220; 375/222; 375/295; 375/316; 455/7; 455/11.1; 455/13.1; 455/15; 370/312; 370/315; 370/328; 370/352; 381/27; 381/300; 381/306; 360/60; 360/77.04; 707/1; 711/158
(58) Field of Classification Search
USPC ............. 375/211, 220, 222, 295, 316; 455/7, 455/11.1, 13.1, 15; 370/312, 315, 328, 352; 381/27, 300, 306; 360/60, 77.04; 707/1; 711/158
See application file for complete search history.

(56) References Cited

U.S. PATENT DOCUMENTS

| 6,041,225 | A | 3/2000 | Jung |
| 6,826,283 | B1 | 11/2004 | Wheeler et al. |
| 2003/0194968 | A1 | 10/2003 | Young |
| 2004/0234088 | A1 | 11/2004 | McCarty et al. |
| 2005/0131558 | A1 | 6/2005 | Braithwaite et al. |
| 2007/0183080 | A1* | 8/2007 | Abe et al. .................. 360/77.04 |
| 2007/0186063 | A1* | 8/2007 | Mogi et al. .................... 711/158 |

FOREIGN PATENT DOCUMENTS

| JP | 3072057 B2 | 5/2000 |
| JP | 2002-232610 A | 8/2002 |
| JP | 2002-328685 A | 11/2002 |
| JP | 2003-196919 A | 7/2003 |
| JP | 2005-301459 A | 10/2005 |
| JP | 2006-080901 | 3/2006 |
| JP | 2007-306088 A | 11/2007 |

(Continued)

OTHER PUBLICATIONS

European Office Action issued Oct. 24, 2012 in connection with European Application No. 10153569.8.

*Primary Examiner* — Leon Flores
(74) *Attorney, Agent, or Firm* — Wolf Greenfield & Sacks, P.C.

(57) ABSTRACT

There is provided a content reproduction apparatus including a reproduction request receiving unit that receives from a first external device conforming to a first communication standard a request to reproduce content data selected by the first external device, a content data obtaining unit that obtains from a second external device conforming to the first communication standard, which stores the content data selected by the first external device, the content data in response to the received request, a content reproduction unit that reproduces the obtained content data, and a data converting unit that converts data which can be transmitted according to the first communication standard into data which can be transmitted according to a second communication standard different than the first communication standard.

14 Claims, 24 Drawing Sheets

(56) References Cited

FOREIGN PATENT DOCUMENTS

| | | |
|---|---|---|
| JP | 2008-159139 A | 7/2008 |
| JP | 2008-166979 A | 7/2008 |
| JP | 2008-206039 A | 9/2008 |
| JP | 2008-288894 A | 11/2008 |
| WO | WO 2007/067974 A2 | 6/2007 |
| WO | WO 2008/117586 A1 | 10/2008 |
| WO | WO 2008/155842 A1 | 12/2008 |

* cited by examiner

FIG.3
PARENT DEVICE
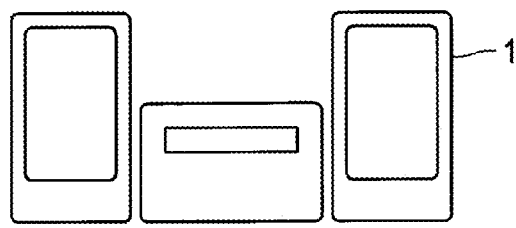
CHILD DEVICE
MAIN CHILD DEVICE
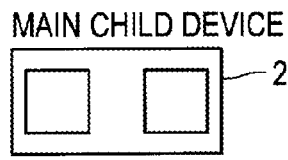
SUB-CHILD DEVICE
(SURROUND REAR)
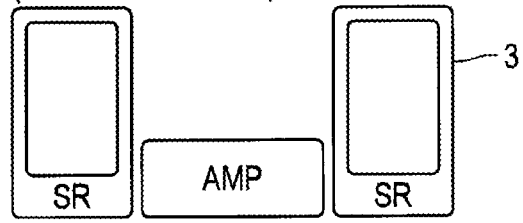
SUB-CHILD DEVICE
(SURROUND BACK)
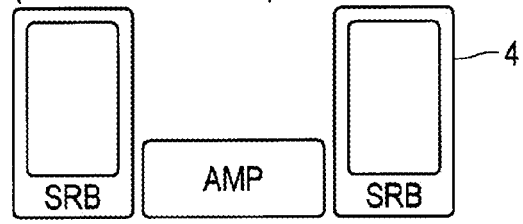

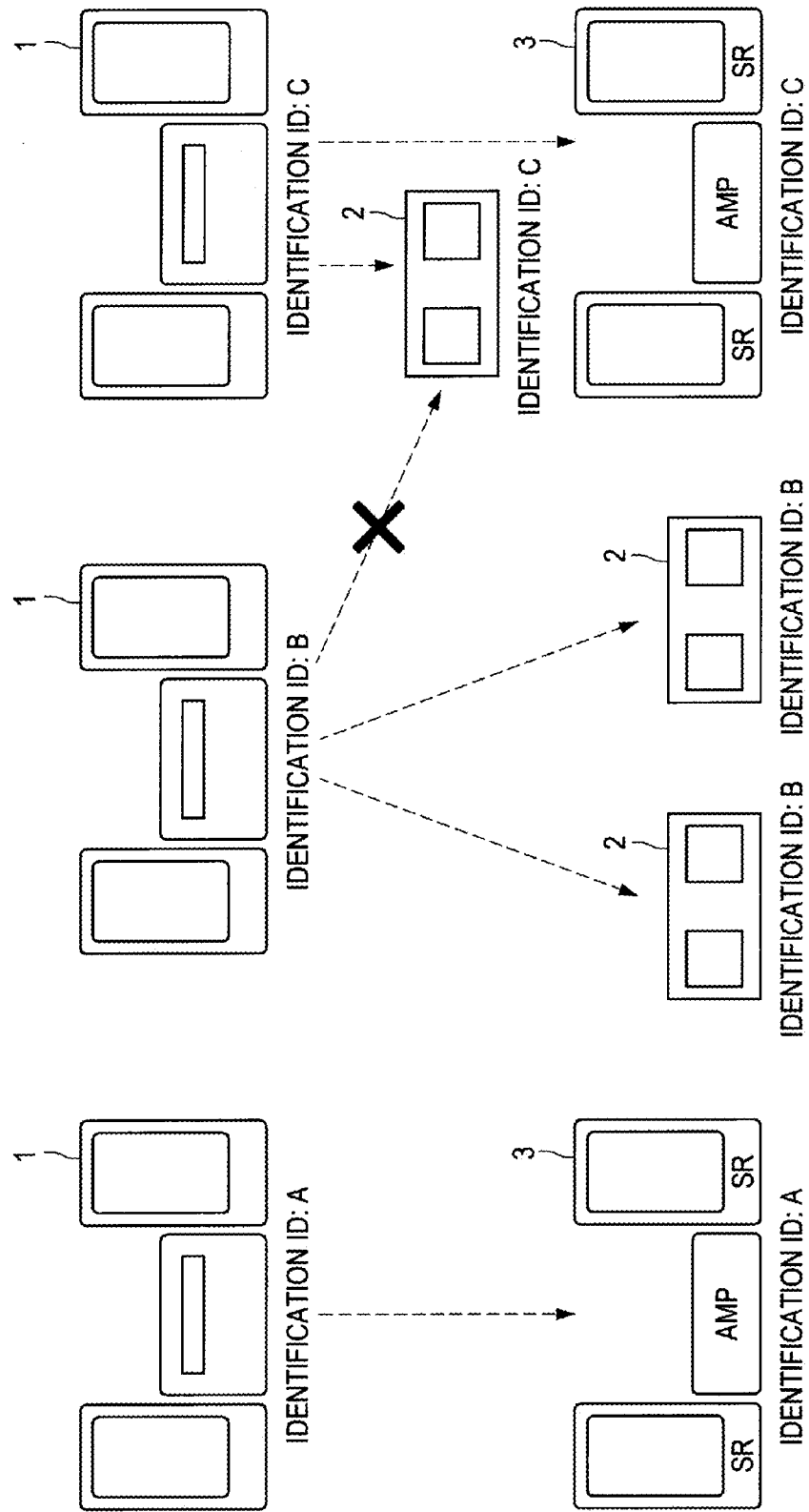

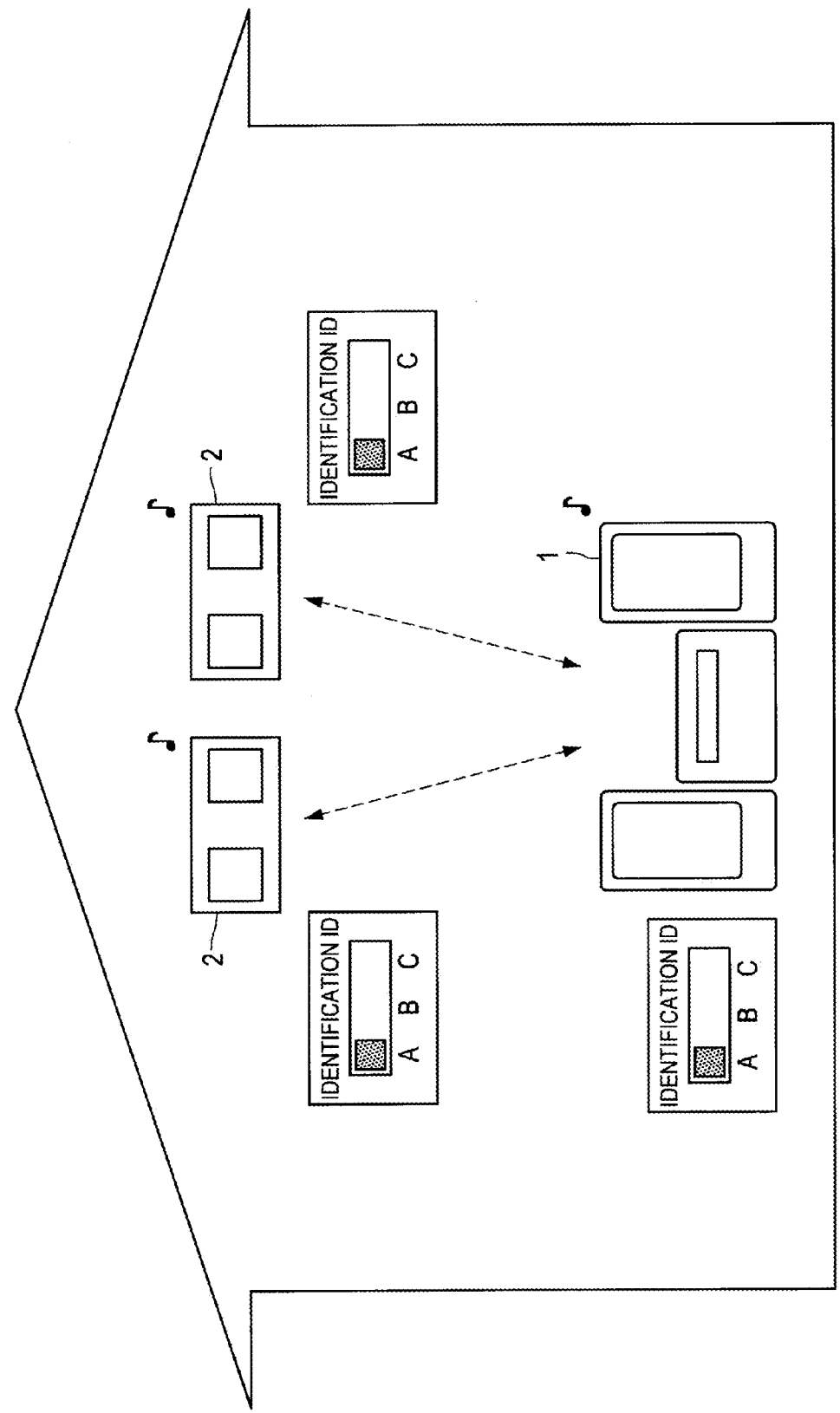

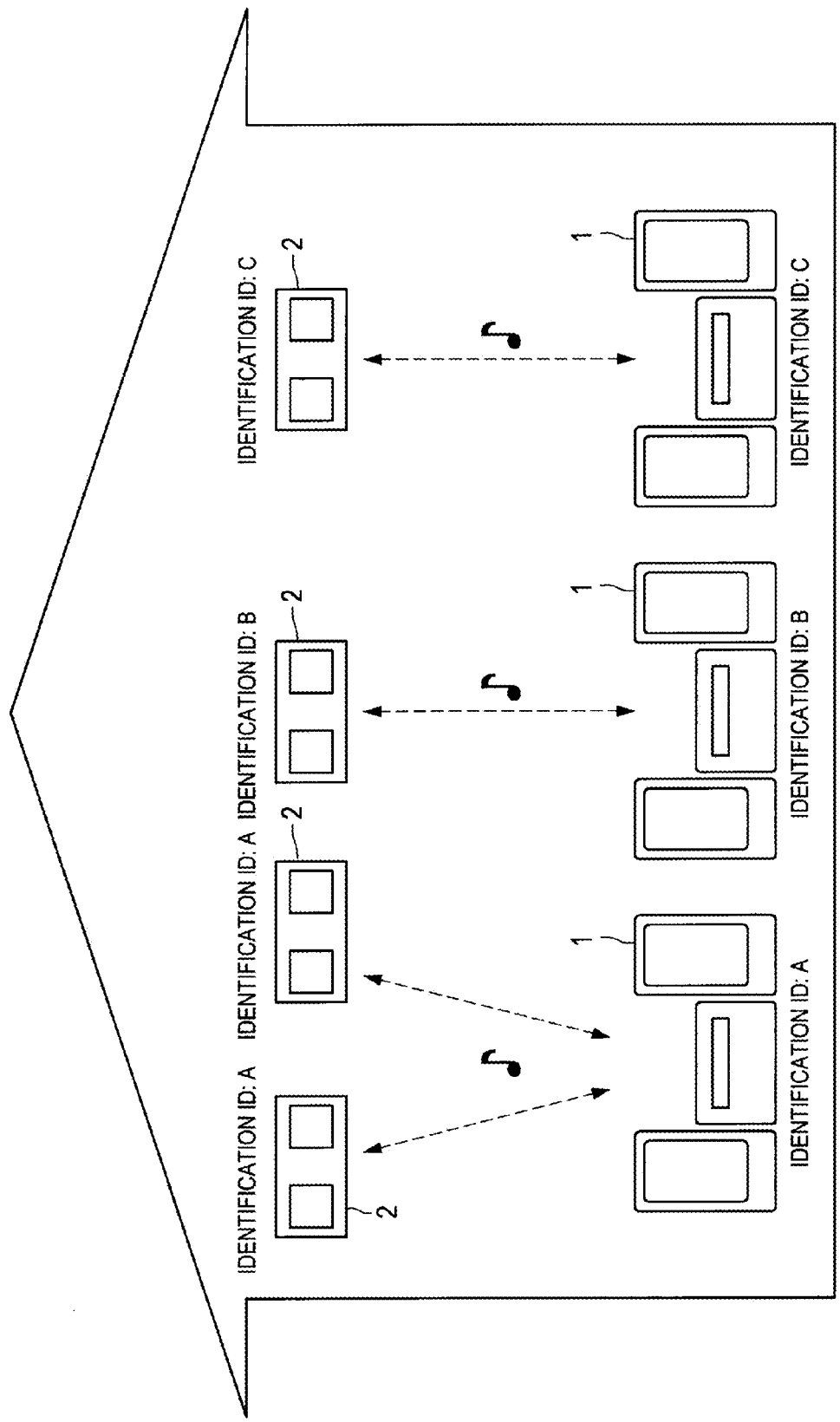

FIG.7A

| CH | No. | AUDIO DATA |
|---|---|---|
| CH1 | No.1 | MAIN CHANNEL (L) |
| | No.2 | MAIN CHANNEL (R) |
| CH2 | No.3 | SUBCHANNEL 1 |
| | No.4 | SUBCHANNEL 2 |
| CH3 | No.5 | SUBCHANNEL 3 |
| | No.6 | SUBCHANNEL 4 |
| CH4 | No.7 | SUBCHANNEL 5 |
| | No.8 | SUBCHANNEL 6 |

FIG.7B

| CH | No. | AUDIO DATA |
|---|---|---|
| CH1 | No.1 | DVD DOWNMIX |
| | No.2 | |
| CH2 | No.3 | SURROUND REAR |
| | No.4 | |
| CH3 | No.5 | SURROUND BACK |
| | No.6 | |
| CH4 | No.7 | SUBWOOFER |
| | No.8 | |

FIG.7C

| CH | No. | AUDIO DATA |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | MAIN CHANNEL 3 (L) |
| | No.6 | MAIN CHANNEL 3 (R) |
| CH4 | No.7 | MAIN CHANNEL 4 (L) |
| | No.8 | MAIN CHANNEL 4 (R) |

FIG.7D

| CH | No. | AUDIO DATA |
|---|---|---|
| CH1 | No.1 | CD |
| | No.2 | |
| CH2 | No.3 | TUNER |
| | No.4 | |
| CH3 | No.5 | DMPORT |
| | No.6 | |
| CH4 | No.7 | AUDIO IN |
| | No.8 | |

FIG.8

| ABBREVIATION | NAME | FUNCTION |
|---|---|---|
| SR | SURROUND REAR Lch | Lch OUTPUT FOR SURROUND REAR SPEAKER |
| SR | SURROUND REAR Rch | Rch OUTPUT FOR SURROUND REAR SPEAKER |
| SB | SURROUND BACK Lch | Lch OUTPUT FOR SURROUND BACK SPEAKER |
| SB | SURROUND BACK Rch | Rch OUTPUT FOR SURROUND BACK SPEAKER |
| SRHP | SURROUND REAR HEADPHONE Lch | Lch OUTPUT FOR SURROUND REAR HEADPHONE TERMINAL |
| SRHP | SURROUND REAR HEADPHONE Rch | Rch OUTPUT FOR SURROUND REAR HEADPHONE TERMINAL |
| SBHP | SURROUND BACK HEADPHONE Lch | Lch OUTPUT FOR SURROUND BACK HEADPHONE TERMINAL |
| SBHP | SURROUND BACK HEADPHONE Rch | Rch OUTPUT FOR SURROUND BACK HEADPHONE TERMINAL |
| SW | SUBWOOFER Lch | Lch OUTPUT FOR SUBWOOFER |
| SW | SUBWOOFER Rch | Rch OUTPUT FOR SUBWOOFER |
| SW/C | SUBWOOFER MONORAL | MONORAL OUTPUT FOR SUBWOOFER |
| SW/C | CENTER | OUTPUT FOR CENTER SPEAKER |

FIG.9A

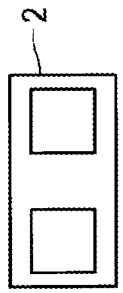

CASE WHERE PARENT DEVICE IS
IN SURROUND MODE

| CH | No. | AUDIO DATA |
|---|---|---|
| CH1 | No.1 | MAIN CHANNEL (L) |
| | No.2 | MAIN CHANNEL (R) |
| CH2 | No.3 | SUBCHANNEL 1 |
| | No.4 | SUBCHANNEL 2 |
| CH3 | No.5 | SUBCHANNEL 3 |
| | No.6 | SUBCHANNEL 4 |
| CH4 | No.7 | SUBCHANNEL 5 |
| | No.8 | SUBCHANNEL 6 |

CASE WHERE PARENT DEVICE IS
IN MULTI-SOURCE MODE

| CH | No. | AUDIO DATA |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | MAIN CHANNEL 3 (L) |
| | No.6 | MAIN CHANNEL 3 (R) |
| CH4 | No.7 | MAIN CHANNEL 4 (L) |
| | No.8 | MAIN CHANNEL 4 (R) |

FIG.9B

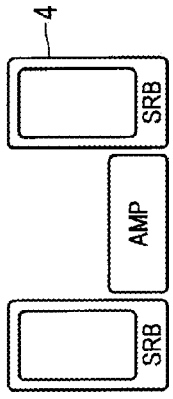

CASE WHERE PARENT DEVICE IS IN SURROUND MODE

| CH | No. | AUDIO DATA |
|---|---|---|
| CH1 | No.1 | MAIN CHANNEL (L) |
| | No.2 | MAIN CHANNEL (R) |
| CH2 | No.3 | SUBCHANNEL 1 |
| | No.4 | SUBCHANNEL 2 |
| CH3 | No.5 | SUBCHANNEL 3 |
| | No.6 | SUBCHANNEL 4 |
| CH4 | No.7 | SUBCHANNEL 5 |
| | No.8 | SUBCHANNEL 6 |

REPRODUCE SR AUDIO DATA

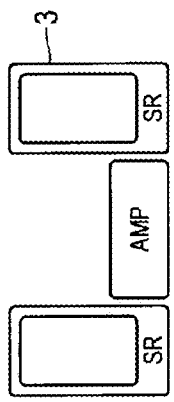

CASE WHERE PARENT DEVICE IS IN MULTI-SOURCE MODE

| CH | No. | AUDIO DATA |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | MAIN CHANNEL 3 (L) |
| | No.6 | MAIN CHANNEL 3 (R) |
| CH4 | No.7 | MAIN CHANNEL 4 (L) |
| | No.8 | MAIN CHANNEL 4 (R) |

REPRODUCE SRB AUDIO DATA

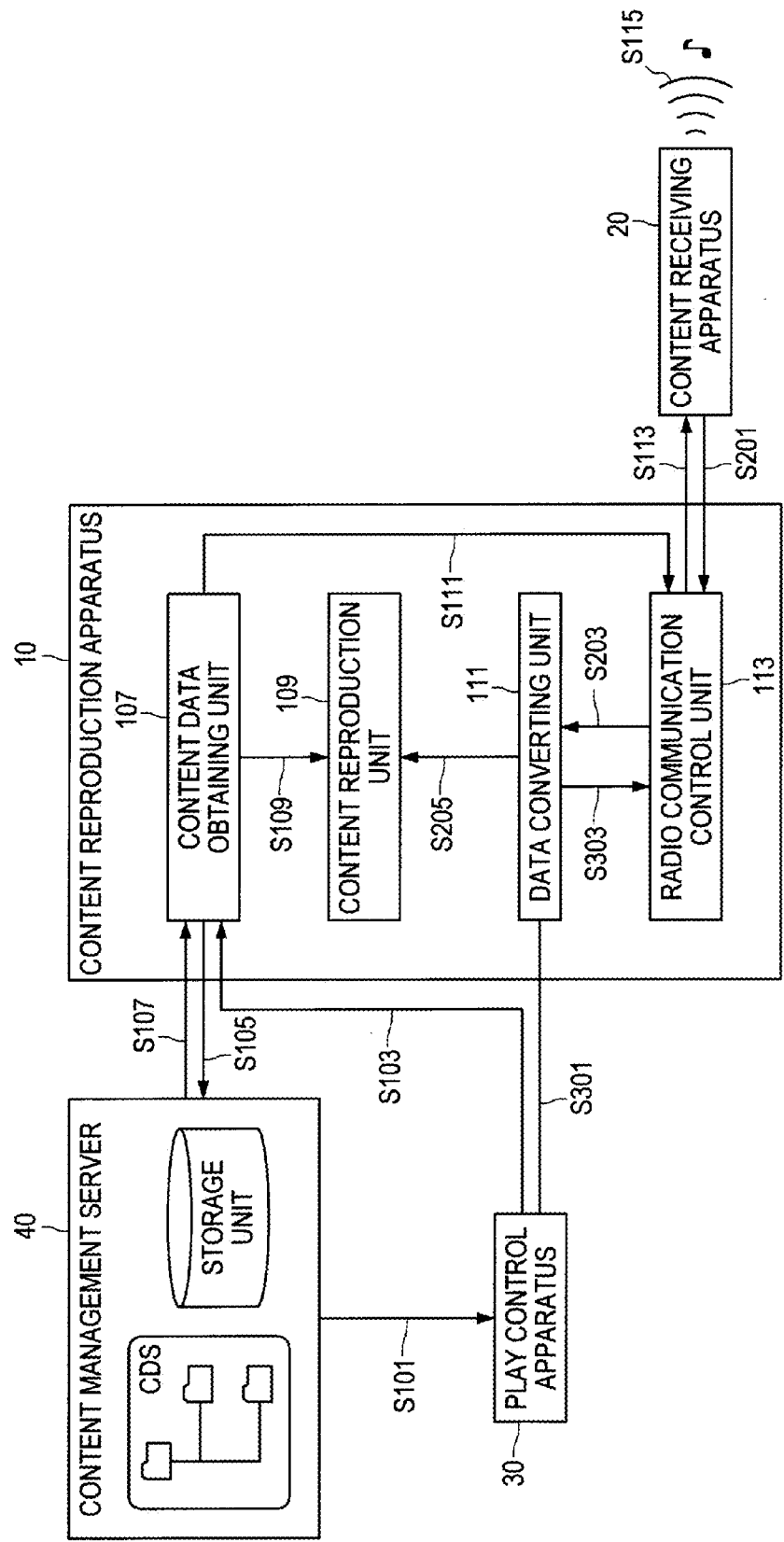

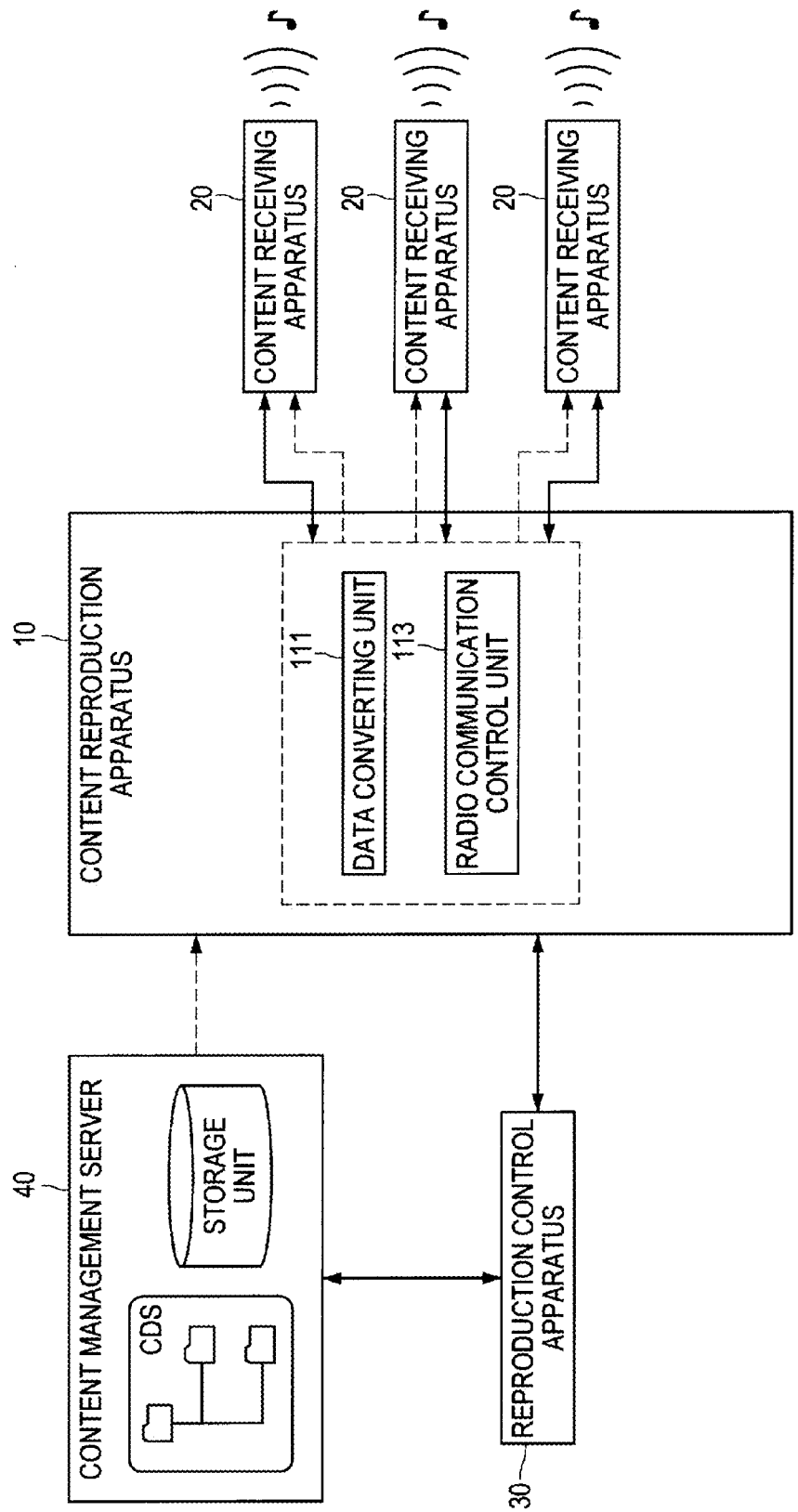

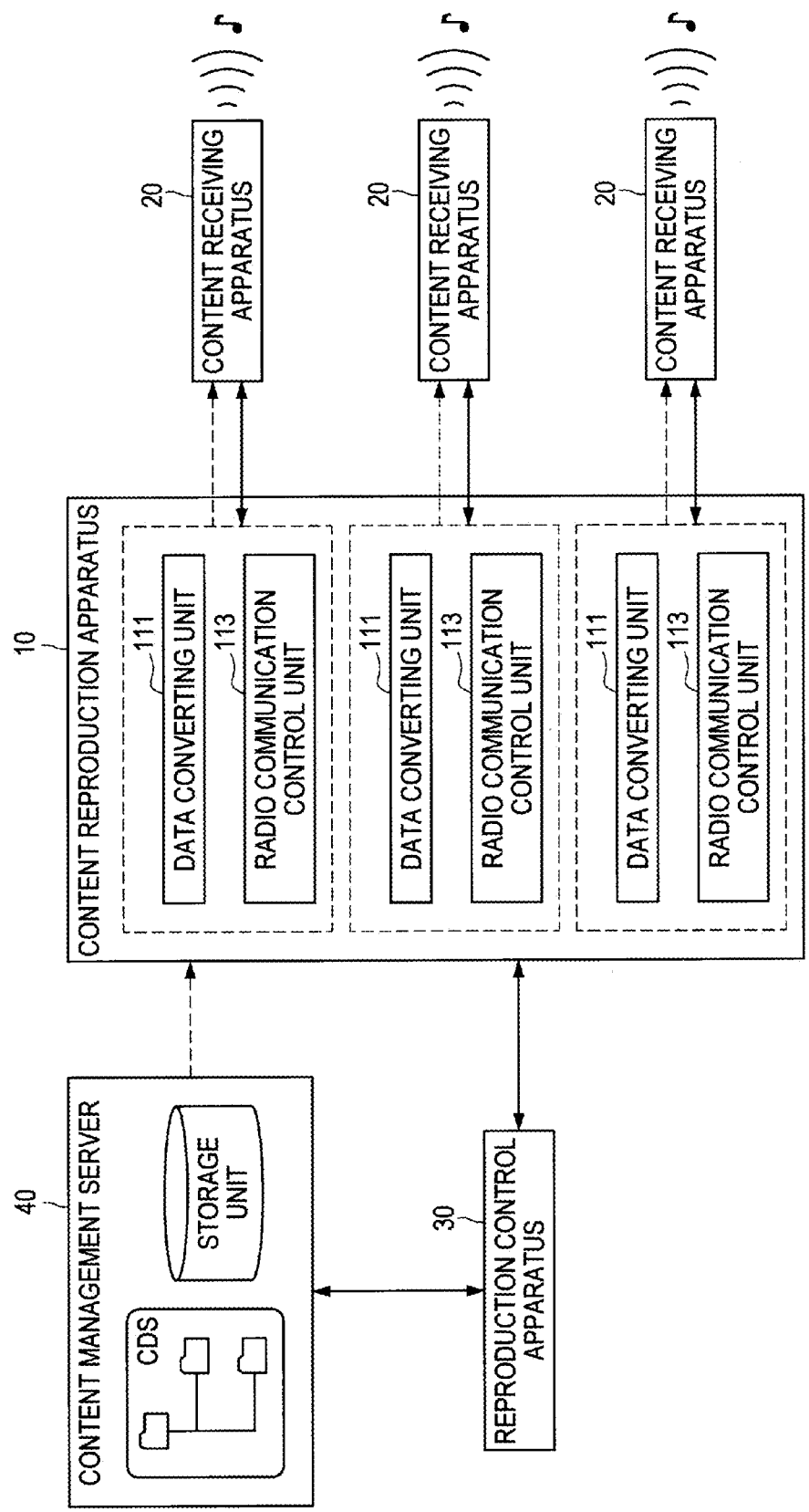

CONTENT REPRODUCTION APPARATUS, CONTENT RECEIVING APPARATUS, METHOD OF REPRODUCING CONTENT, PROGRAM, AND CONTENT REPRODUCTION SYSTEM

CROSS-REFERENCE TO RELATED APPLICATIONS

This application claims priority under 35 U.S.C. § 119 to Japanese Patent Application JP 2009-047005, filed in the Japanese Patent Office on Feb. 27, 2009, the entire contents of which are incorporated herein by reference.

BACKGROUND OF THE INVENTION

1. Field of the Invention

The present invention relates to a content reproduction apparatus, a content receiving apparatus, a method of reproducing content, a program, and a content reproduction system.

2. Description of the Related Art

With the recent proliferation of data communication networks, it has become possible that content is shared between devices which can communicate over a network, and that between the devices, content owned by one device is reproduced by another device (see, for example, Japanese Patent Application Laid-Open No. 2006-80901).

Also in homes, a so-called home network has begun to permeate that enables communications between devices by establishing a direct connection or network connection between household electrical appliances, computers, and other peripheral devices. In the home network, by performing communication between network-connected devices, the data processing functions of the respective devices are shared between the devices or transmission and reception of content are performed between the devices, whereby a user is provided with convenience and amenity. Thus, further spread of the home network is expected in the future.

As a standard used when such a home network is constructed using AV devices, personal computers (hereinafter, referred to as PCs), mobile devices, etc., there is DLNA (Digital Living Network Alliance).

A DLNA-compliant system has advantages in that devices constituting the system can recognize each other and the degree of flexibility in content selection is high, such as the ability to select a reproduction target in units of content.

SUMMARY OF THE INVENTION

However, to construct the DLNA home network described above, setting needs to be performed to realize a connection between DLNA-compliant devices. The setting often requires technical knowledge and thus there is an issue that operations for the setting are cumbersome to a user.

Further, in a DLNA-compliant content reproduction system, various pieces of content are stored in a device called the Digital Media Server (DMS) and a list of the pieces of content is managed by a structure having a folder hierarchy called the Content Directory Service (CDS). Since content is managed by such a hierarchical structure, there is another issue that selection of content to be reproduced may be cumbersome to the user.

In light of the foregoing, it is desirable to provide a content reproduction apparatus, a content receiving apparatus, a method of reproducing content, a program, and a content reproduction system that can facilitate the setting of the connection between devices and selection of content while making use of the advantages of DLNA.

According to an embodiment of the present invention, there is provided a content reproduction apparatus including a reproduction request receiving unit that receives from a first external device conforming to a first communication standard a request to reproduce content data selected by the first external device, a content data obtaining unit that obtains from a second external device conforming to the first communication standard, which stores the content data selected by the first external device, the content data in response to the request received by the reproduction request receiving unit, a content reproduction unit that reproduces the content data obtained by the content data obtaining unit, and a data converting unit that converts data which can be transmitted according to the first communication standard into data which can be transmitted according to a second communication standard different than the first communication standard.

The content reproduction apparatus may further include a converted data transmitting unit that transmits the data which is converted by the data converting unit and can be transmitted according to the second communication standard to a third external device conforming to the second communication standard.

When the data converting unit receives from the third external device a processing instruction signal for causing the content reproduction apparatus to perform a predetermined processing, the data converting unit may convert the processing instruction signal into a signal can be transmitted according to the first communication standard and may output the signal to the content reproduction unit, and the content reproduction unit may perform the predetermined processing based on the converted processing instruction signal.

A plurality of the data converting units may be provided, and when there are a plurality of the third external devices, each of the data converting units may receive data from the third external devices which are different from each other.

Each of the data converting units can perform data transmission with other data converting units.

The second communication standard may realize the data transmission by radio communication with a 2.4 GHz-band between devices which can communicate according to the second communication standard using a plurality of channels which are paths for transmitting data including audio signals.

The data converting unit may receive from the first external device a sound volume control signal for adjusting reproduction sound volume of the content data on the third external device, may convert the received sound volume control signal, and may output the converted sound volume control signal to the converted data transmitting unit, and the converted data transmitting unit may transmit the converted sound volume control signal to the third external device.

The data converting unit may determine whether the transmission of the content data is performed using either a first data transmission scheme according to which the audio signals of different sound source types are transmitted on each of the plurality of channels or a second data transmission scheme according to which the audio signals of a same sound source type are transmitted on each of the plurality of channels.

According to another embodiment of the present invention, there is provided a content receiving apparatus including a content data obtaining unit that obtain content data, being reproduced on a second external device based on control by a first external device conforming to a first communication standard, from the second external device by communication according to a second communication standard different than the first communication standard, and a content reproduction unit that reproduces the content data obtained by the content data obtaining unit.

The content receiving apparatus may further include a processing instruction signal generating unit that generates a processing instruction signal for causing the second external device to perform a predetermined processing; and a processing instruction signal transmitting unit that transmits the processing instruction signal generated by the processing instruction signal generating unit to the second external device as a signal conforming to the second communication standard.

The second communication standard may realize the data transmission by radio communication with a 2.4 GHz-band between devices which can communicate according to the second communication standard using a plurality of channels which are paths for transmitting data including audio signals.

The content receiving apparatus may further include a control signal receiving unit that receives, when a sound volume control signal for adjusting reproduction sound volume of the content data on the content receiving apparatus is transmitted from the first external device to the second external device as data which can be transmitted according to the first communication standard, the sound volume control signal which is converted by the second external device into data which can be transmitted according to the second communication standard. The content reproduction unit may adjust the reproduction sound volume of the content data being reproduced, based on the sound volume control signal received by the control signal receiving unit.

According to another embodiment of the present invention, there is provided a method of reproducing content, the method including the steps of receiving from a first external device conforming to a first communication standard a request to reproduce content data selected by the first external device, in response to the received request, obtaining from a second external device conforming to the first communication standard, which stores the content data selected by the first external device, the content data, reproducing the obtained content data, converting the content data being reproduced into data which can be transmitted according to a second communication standard different than the first communication standard, and transmitting the converted content data to a third external device conforming to the second communication standard.

According to another embodiment of the present invention, there is provided a method of reproducing content, the method including the step of, when content data being reproduced on a second external device based on control by a first external device conforming to a first communication standard is converted by the second external device into data which can be transmitted according to a second communication standard different than the first communication standard, obtaining the converted content data, and reproducing the obtained content data.

According to another embodiment of the present invention, there is provided a program for causing a computer to implement a reproduction request receiving function of receiving from a first external device conforming to a first communication standard a request to reproduce content data selected by the first external device, a content data obtaining function of obtaining from a second external device conforming to the first communication standard, which stores the content data selected by the first external device, the content data in response to the request received by the reproduction request receiving function, a reproducing function of reproducing the content data obtained by the content data obtaining function, and a data converting function of converting data which can be transmitted according to the first communication standard into data which can be transmitted according to a second communication standard different than the first communication standard.

According to another embodiment of the present invention, there is provided a program for causing a computer to implement, a content data obtaining function of obtaining, when content data being reproduced on a second external device based on control by a first external device conforming to a first communication standard is converted by the second external device into data which can be transmitted according to a second communication standard different than the first communication standard, the converted content data, and a reproducing function of reproducing the content data obtained by the content data obtaining function.

According to another embodiment of the present invention, there is provided a content reproduction system including a content management server including a storage unit that stores predetermined content data; and a content data providing unit that provides the content data to an external device conforming to a first communication standard, a reproduction control apparatus including a content data obtaining unit that obtains a list of the content data managed by the content management server; and a reproduction apparatus control unit that requests the external device conforming to the first communication standard to reproduce content data selected from the obtained list of the content data, a content reproduction apparatus including a content data obtaining unit that obtains the content data selected by the reproduction control apparatus from the content management server in response to the request from the reproduction control apparatus; a content reproduction unit that reproduces the obtained content data; a data converting unit that converts data which can be transmitted according to the first communication standard into data which can be transmitted according to a second communication standard different than the first communication standard; and a converted data transmitting unit that transmits the data which is converted by the data converting unit and can be transmitted according to the second communication standard to an external device conforming to the second communication standard, and a content receiving apparatus including a content data obtaining unit that obtains the content data being reproduced by the content reproduction apparatus from the content reproduction apparatus by communication according to the second communication standard; and a content reproduction unit that reproduces the content data obtained by the content data obtaining unit.

According to the present invention, a content reproduction apparatus, a content receiving apparatus, a method of reproducing content, a program, and a content reproduction system can be provided that can facilitate the setting of the connection between devices and selection of content while making use of the advantages of DLNA.

BRIEF DESCRIPTION OF THE DRAWINGS

FIG. 3 is an explanatory diagram for illustrating a drawing which depicts devices used in audio signal radio transmission technology;

FIG. 4 is an explanatory diagram for illustrating a summary of functions of the audio signal radio transmission technology;

FIG. 6A is an explanatory diagram for illustrating a function of a connection ID in the audio signal radio transmission technology;

FIG. 6B is an explanatory diagram for illustrating a function of a connection ID in the audio signal radio transmission technology;

FIG. 7A is an explanatory diagram for illustrating a mode of a parent device in the audio signal radio transmission technology;

FIG. 7B is an explanatory diagram for illustrating a mode of a parent device in the audio signal radio transmission technology;

FIG. 7C is an explanatory diagram for illustrating a mode of a parent device in the audio signal radio transmission technology;

FIG. 7D is an explanatory diagram for illustrating a mode of a parent device in the audio signal radio transmission technology;

FIG. 8 is an explanatory diagram for illustrating an example of subchannel types in the audio signal radio transmission technology;

FIG. 9A is an explanatory diagram for illustrating audio signals which can be reproduced by a main child device in the audio signal radio transmission technology;

FIG. 9B is an explanatory diagram for illustrating audio signals which can be reproduced by a sub-child device in the audio signal radio transmission technology;

FIG. 18 is an explanatory diagram for illustrating a first use case of the content reproduction system according to the embodiment;

FIG. 19 is an explanatory diagram for illustrating a second use case of the content reproduction system according to the embodiment; and FIG. 20 is an explanatory diagram for illustrating a third use case of the content reproduction system according to the embodiment.

DETAILED DESCRIPTION OF THE EMBODIMENTS

Figure 1:
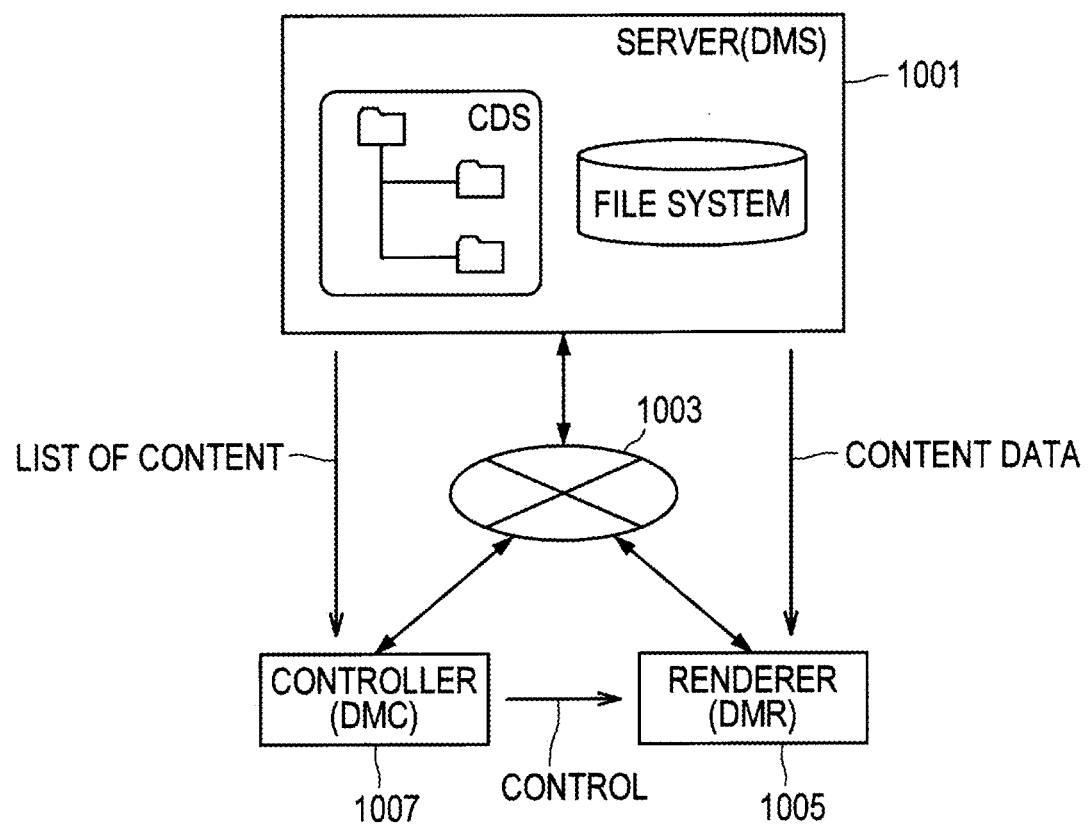
FIG. 1 is an explanatory diagram for illustrating a method of sharing content and a method of reproducing content on a home network.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. Fundamental technologies
1-1. Regarding DLNA
1-2. Regarding audio signal radio transmission technology
2. Advantages and disadvantages of the respective fundamental technologies
3. Embodiment of the present invention
4. Summary <1. Fundamental Technologies>

First, before describing an embodiment of the present invention, technical matters (which hereinafter may be simply referred to as "fundamental technologies") that form foundations for implementing a content reproduction system according to the embodiment of the present invention will be described in detail. Note that the embodiment of the present invention is designed so that more remarkable effects are obtained by making an improvement to the fundamental technologies described below. Therefore, a technology pertaining to the improvement is the portion forming the features of the embodiment. That is, the embodiment follows the basic concept of the technical matters described herein but the nature of the embodiment is rather summarized in the improved portion and thus the configuration of the embodiment clearly differs from that of the fundamental technologies and the effects obtained by the embodiment are distinctive from those obtained by the fundamental technologies.

[1-1. Regarding DLNA]

Figure 2:
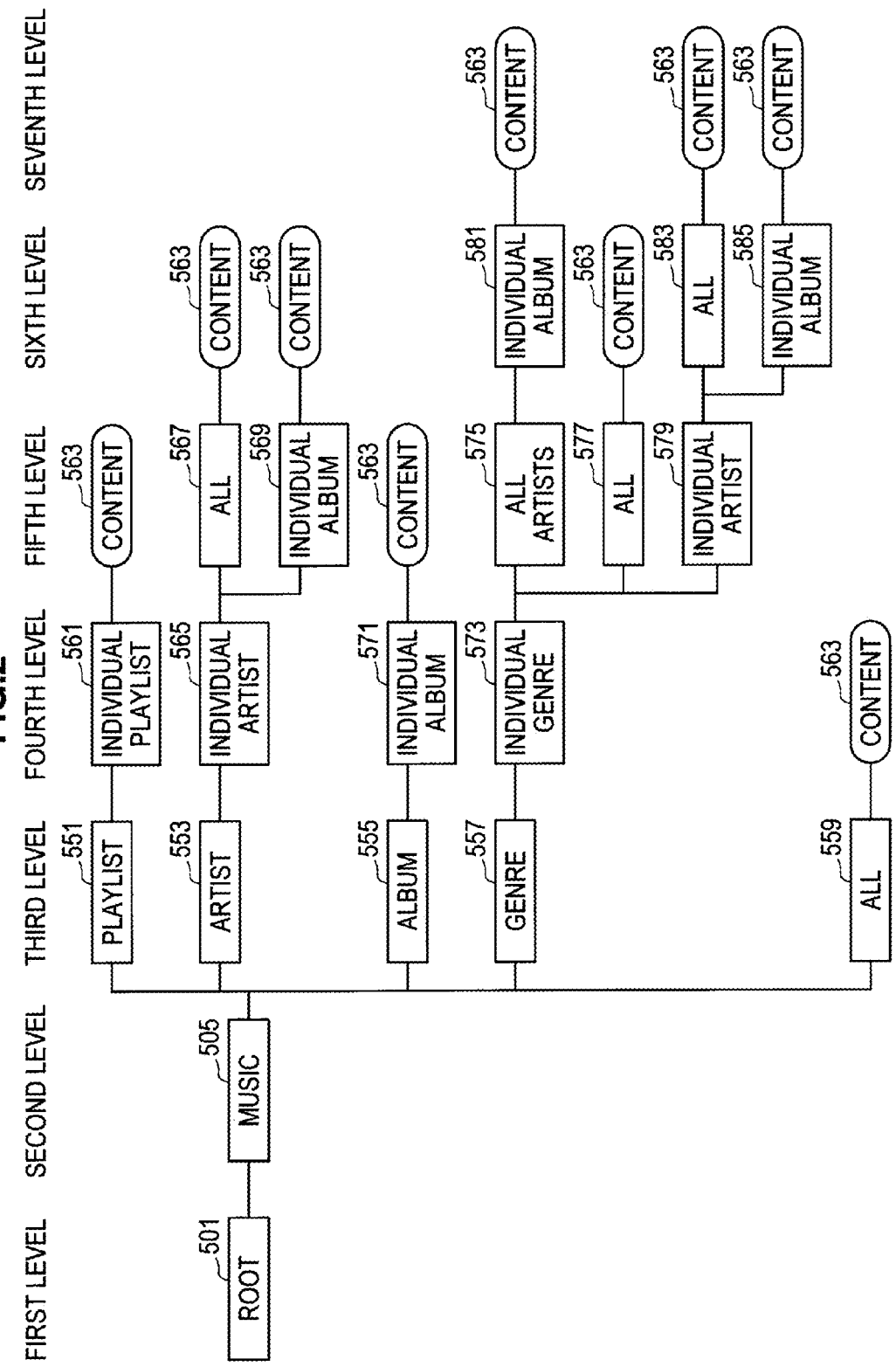
FIG. 2 is an explanatory diagram for illustrating a method of managing content in DLNA.

In the following, as the fundamental technologies, a method of sharing content and a method of reproducing content on a home network which are currently proposed will be described in detail with reference to FIGS. 1 and 2. FIG. 1 is an explanatory diagram for illustrating a method of sharing content and a method of reproducing content on a home network. FIG. 2 is an explanatory diagram for illustrating a method of managing content in DLNA.

Currently, as a standard used when a home network is constructed using AV devices, personal computers, mobile devices, etc., there is DLNA (Digital Living Network Alliance).

In the DLNA guidelines, as shown in FIG. 1, pieces of content such as photos, music, and video are stored in a device called a Digital Media Server (DMS) 1001 and a list of the pieces of content is managed by a structure having a folder hierarchy called the Content Directory Service (CDS). Each piece of content in the CDS is provided with an ID value for uniquely identifying the content, meta-data which is detailed information on the content, and a URL indicating where to obtain content data.

Now, a hierarchical structure for content managed by the CDS will be described with reference to FIG. 2.

In the following description, each individual piece of content, a folder storing a plurality of pieces of content, or the like, is called an object. Note that the object is a generic term for the unit of data processed by the DMS 1001 and there can be various objects other than each individual piece of content and a folder storing a plurality of pieces of content. The object may be any content data, e.g., image content including a moving image or still image such as a movie, a television program, a video program, or a chart, audio content such as music, a lecture, or a radio program, game content, document content, and software. Video content may contain not only video data but also audio data.

A minimum unit of content, e.g., one music data unit (track), one moving image data unit, one still image data unit, etc., is called an item. In the case of live streaming data, one channel is treated as one item.

A higher object of items which is defined as a set of items mentioned above is called a container. The unit of the set can be set in various ways, e.g., a set based on the physical storage locations of objects, a set based on the logical relationship between objects, a set based on categories, etc.

Although, in an example shown in FIG. 2 which will be described below, description is made using an example case in which the content managed by the CDS is music content, content in the embodiment of the present invention is not limited to music content. Furthermore, in the following description, a hierarchical structure in the case where the content managed by the CDS is music content is referred to as the "music tree".

As is clear from the overall structure of a music tree shown in FIG. 2, music content is structured by seven levels from a first level to a seventh level. As the first level, a [ROOT] container 501 is arranged. Note that the "ROOT" indicates a container assigned "0" as an ID and is an identifier indicating that it is possible to provide a service called a container located at the top level in the music tree.

Immediately below the first level is arranged a [music] container 505. The [music] container 505 serves as a second level. As a child container of the [music] container 505, five containers located at a third level are arranged. The containers located at the third level include, for example, a [playlist] container 551, an [artist] container 553, an [album] container 555, a [genre] container 557, and an [all] container 559.

The [playlist] container 551 is a container into which playlists set by an owner of a content management server 40 fall. As a child container of the [playlist] container 551, an [individual playlist] container 561 is arranged into which an individual playlist set by the owner of the content management server 40 falls. Note that although FIG. 2 shows only one [individual playlist] container 561 as a fourth level, in practice a plurality of [individual playlist] containers 561 are arranged. At a level below each of the plurality of [individual playlist] containers 561, a plurality of pieces of music content 563 which are included in a corresponding playlist are associated, as items, with the [individual playlist] container 561.

The [artist] container 553 is a container into which pieces of music content fall based on artist information included in content attribute information. As a child container of the [artist] container 553, an [individual artist] container 565 based on an artist name, a group name, etc., is arranged. Note that although FIG. 2 shows only one [individual artist] container 565 as the fourth level, in practice a plurality of [individual artist] containers 565 are arranged based on artist information included in content attribute information.

As child containers of each of the plurality of [individual artist] containers 565, an [all] container 567 and an [individual album] container 569 may be arranged. All pieces of music content 563 of an artist associated with a parent container of the [all] container 567 are associated, as items, with the [all] container 567. In the [individual album] container 569 are arranged all albums which are managed by the content management server 40 for an artist associated with a parent container of the [individual album] container 569. Note that although FIG. 2 shows only one [individual album] container 569 as a fifth level, in practice a plurality of [individual album] containers 569 are arranged based on the types of albums of an artist associated with a parent container. At a level below each of the plurality of [individual album] containers 569, pieces of music content 563 contained in a corresponding album are associated, as items, with the [individual album] container 569.

The [album] container 555 is a container into which pieces of music content fall based on album information included in content attribute information. As a child container of the [album] container 555, an [individual album] 571 is arranged to which all albums managed by the content management server 40 are allocated irrespective of artist name, etc. Note that although FIG. 2 shows only one [individual album] container 571 as the fourth level, in practice a plurality of [individual album] containers 571 are arranged based on album information included in content attribute information. At a level below each of the plurality of [individual album] containers 571, a plurality of pieces of music content 563 contained in a corresponding album are associated, as items, with the [individual album] container 571.

The [genre] container 557 is a container into which pieces of music content fall based on genre information included in content attribute information. As a child container of the [genre] container 557, an [individual genre] 573 is arranged to which all pieces of music content managed by the content management server 40 are allocated irrespective of artist name, album name, etc., based on genre information included in content attribute information. Note that although FIG. 2 shows only one [individual genre] container 573 as the fourth level, in practice a plurality of [individual genre] containers 573 are arranged based on genre information included in content attribute information.

As child containers of each of the [individual genre] containers 573, for example, an [all artists] container 575, an [all] container 577, and an [individual artist] container 579 are arranged.

The [all artists] container 575 is a container into which pieces of music content, whose content attribute information includes genre information that matches an individual genre of a parent container, fall irrespective of artist name. As a child container of the [all artists] container 575, an [individual album] container 581 is arranged into which all albums falling into the same genre as the [individual genre] container 573 fall on an album-by-album basis. Furthermore, at a level below the [individual album] container 581, pieces of music content 563 contained in a corresponding album are associated, as items, with the [individual album] container 581.

The [all] container 577 is a container into which all pieces of music content, whose genre information matches a genre of the [individual genre] container 573 as a parent container, fall. At a level below the [all] container 577, all pieces of music content 563 having the same genre information as the [individual genre] container 573 are associated, as items, with the [all] container 577.

The [individual artist] container 579 is a container into which all pieces of music content, whose genre information matches a genre of the [individual genre] container 573 as a parent container, fall on an artist-name-by-artist-name basis. Although FIG. 2 shows only one [individual artist] container 579 as the fifth level, in practice a plurality of [individual artist] containers 579 are arranged for artists belonging to the same genre as an individual genre of the parent container. As child containers of each of the [individual artist] containers 579, an [all] container 583 and an [individual album] container 585 are arranged for each artist. At a level below the [all] container 583, among music content that belong to the same genre as the [individual genre] container 573, all pieces of music content 563 of an artist belonging to the [individual artist] container 579 are associated, as items, with the [all] container 583. Of those pieces of music content that belong to the same genre as the [individual genre] container 573, pieces of music content of an artist belong to the [individual artist] container 579 are associated with the [individual album] container 585 on an album-by-album basis. At a level below the [individual album] container 585, pieces of music content 563 contained in a corresponding album are associated, as items, with the [individual album] container 585.

The [all] container 559 is a container into which all pieces of music content managed by the content management server 40 fall. At a level below the [all] container 559, pieces of music content 563 managed by the content management server 40 are allocated as items. Note that the [all] container 559 can be used when a client device 30 intends to perform shuffle play of music content, etc.

Generating a music tree as described above, when the client device 30 browses or searches for content, it is possible for the client device 30 to browse or search for content by selecting an appropriate container at each level in order from the first level and further searching a child container of the selected container.

The CDS that manages content by a hierarchical structure described above with reference to FIG. 2 is released to other devices on a home network 1003. Then, a client device reproducing content selects content by tracing the CDS on the DMS, obtains content data indicated by a URL from the digital media server 1001, and reproduces the content data. Here, as a protocol used for communication between the DMS 1001 and the client device (e.g., mutual communication such as obtaining a list or obtaining content data), HTTP is used.

As shown in FIG. 1, the DLNA guidelines define a device 1005 called a renderer (Digital Media Renderer (DMR)) that does not actively trace a list of content itself but specializes in only reproducing content specified by another device. When the DMR 1005 is notified of a URL of content to be played, the DMR 1005 obtains content data at a location indicated by the URL using HTTP and reproduces the content data. A device that performs specification of content and operations such as reproduce, stop, and seek on the DMR 1005 is called a controller (Digital Media Controller (DMC)) 1007. The DMC 1007 generally has the function of selecting content by tracing the CDS on the DMS 1001. A content sharing/reproducing communication model including a DMS, a DMC, and a DMR, such as that shown in FIG. 1, is called a 3-box model.

Between DLNA-compliant devices (e.g., a DMS, a DMC, and a DMR), TCP/IP communication is realized using an UPnP (Universal Plug & Play) addressing function, and device authentication is performed between the devices using an UPnP discovery function. Accordingly, each device can recognize device(s) to which each device can connect, i.e., grasp a network configuration, and can accordingly perform communication with a target electronic device.

Note that devices such as the above-described DMS, DMC, and DMR are conceptual devices classified based on their respective functions and thus do not need to have a one-to-one correspondence with physical hardware. Note also that since communication between devices is performed using a protocol constructed based on IPv4 (e.g., TCP/UDP, HTTP/SOAP, etc.), it is premised that hardware that implements each device has a communication function which can handle an Internet Protocol (IP) (typically, Ethernet (registered trademark), a wireless LAN, etc.).

[1-2. Regarding Audio Signal Radio Transmission Technology]

In addition to the aforementioned DLNA, as an example of the fundamental technologies in embodiments of the present invention, there is a technology (hereinafter, referred to as the "audio signal radio transmission technology" (S-AIR [registered trademark])) for transmitting, by radio communication, data including an audio signal between devices which can communicate according to a communication standard different than DLNA. The audio signal radio transmission technology will be described below with reference to FIGS. 3 to 9B.

First, terms used in describing the audio signal radio transmission technology are defined as follows.

(1) Source: a sound source of an audio signal.
(2) Channel: a path used to transmit an audio signal, data, etc. In the audio signal radio transmission technology, for example, 4-channel stereo audio signals can be transmitted and thus the channels of audio transmission are sequentially represented as CH1, CH2, CH3, and CH4.
(3) Main channel: a channel that can be reproduced by a main child device. An independent source is basically assigned to the main channel. The main child device is defined below.
(4) Subchannel: a channel that can be reproduced by a sub-child device. An audio signal derived from one source is mainly assigned to the subchannel as a surround audio signal. The sub-child device is defined below.
(5) Parent device: a device that can transmit audio signals. The parent device takes either a surround mode or multi-source mode state, according to the ability of the device. In the parent device in the surround mode, only CH (channel) 1 serves as a main channel and other CHs serve as subchannels. In the parent device in the multi-source mode, all channels serve as main channels.
(6) Child device: a device that can receive audio signals. The child device serves as either a main child device that reproduces a main channel or a sub-child device that reproduces a subchannel.
(7) Main child device: a child device that reproduces a main channel of a parent device. When the parent device is in the surround mode, all main child devices that are linked to the parent device can reproduce CH1. When the parent device is in the multi-source mode, each individual main child device can select one channel from CH1, CH2, CH3, and CH4 and reproduce the selected channel.
(8) Sub-child device: a child device that reproduces a subchannel of a parent device. When the parent device is in the surround mode, the sub-child device can select a subchannel of the parent device that conforms to the functionality of the sub-child device according to channel mapping, and reproduce the selected subchannel. When the parent device does not have a subchannel function of the sub-child device, the sub-child device does not perform reproduction. When the parent device is in the multi-source mode, the sub-child device may not be linked to the parent device.
(9) Connection ID: an identifier used to prevent an erroneous connection between a parent device and a child device.
(10) Sync: a term indicating that a parent device and a child device can communicate with each other.
(11) Link: a term indicating a state in which, after a parent device and a child device come into sync with each other, by performing predetermined procedural steps an audio signal has actually become ready to be reproduced.

(12) ROOM: a unit indicating the number of sources that can be simultaneously reproduced/transmitted by a parent device. In the audio signal radio transmission technology, a source itself, which is reproduced by the parent device, is defined as MAIN ROOM and sources that transmit channels of wireless audio transmission to CH1, CH2, CH3, and CH4 are defined as ROOM1, ROOM2, ROOM3, and ROOM4, respectively. When the parent device is in the surround mode, since only CH1 serves as a main channel, the number of reproducible/transmittable sources is two (ROOMs), i.e., MAIN ROOM and ROOM1. Similarly, when the parent device is in the multi-source mode, the number of reproducible/transmittable sources is five (ROOMs) at the maximum, i.e., MAIN ROOM and ROOMs 1 to 4.

(13) FUNCTION: a term indicating a function provided to a device. When a child device has a plurality of functions, the fundamental technologies also serve as one function.

Note that, in examples (use cases) shown in the following FIGS. 4 to 9B, a parent device and child devices are represented as shown in FIG. 3. FIG. 3 is an explanatory diagram for illustrating a drawing which depicts devices used in the audio signal radio transmission technology. As shown in FIG. 3, in the following FIGS. 4 to 9B, a parent device is represented by the one denoted by reference numeral 1. A main child device is represented by the one denoted by reference numeral 2 and a sub-child device is represented by the one denoted by reference numeral 3 or 4.

Next, a summary of functions of the audio signal radio transmission technology will be described in detail with reference to FIG. 4. FIG. 4 is an explanatory diagram for illustrating a summary of functions of the audio signal radio transmission technology.

The audio signal radio transmission technology is a communication standard for transmitting audio signals from one parent device to a plurality of child devices and has features, for example, shown below.

(1) The technology can be used as a successor to digital wireless optical transmission technology and can implement a simple multi-room system.

(2) The technology makes it possible to simultaneously transmit four 2-channel stereo linear PCM audio signals at the same time with CD quality.

(3) The technology has data channels separately from audio channels and realizes communication between the parent device and the child devices.

(4) The technology provides a wireless communication system with 2.4 GHz-band but is not compatible with Bluetooth (registered trademark) or wireless LANs (IEEE 802.11b/g, etc.).

In addition, for example, as shown in FIG. 4, when the connection ID basically matches between a parent device and a child device, the parent device and the child device are linked to each other only by turning on power, and it becomes possible to wirelessly reproduce music.

(Summary of the Functions of a Parent Device)

A parent device in the audio signal radio transmission technology can, for example, transmit an audio signal to a child device, adjust the volume of the child device, and obtain a state of the child device.

(Summary of the Functions of a Child Device)

A child device in the audio signal radio transmission technology can reproduce an audio signal transmitted from a parent device and can be used as a surround child device or main child device and can display data transmitted from the parent device. Some child devices can even operate the running state of the parent device.

(Regarding Connection Between a Parent Device and Child Devices)

In the following, functions provided to at least any one of a connection control unit of a parent device which includes a CPU (Central Processing Unit), a ROM (Read Only Memory), a RAM (Random Access Memory), a DSP (Digital Signal Processor), an external device communication unit, etc., and a connection control unit of a child device which includes a CPU, a ROM, a RAM, a DSP, an external device communication unit, etc., will be described in detail. Note that the connection control units of the parent device and the child device may further include a plurality of processing units specialized in respective functions which will be described below.

(Regarding Devices Connectable with Each Other)

Figure 5A:
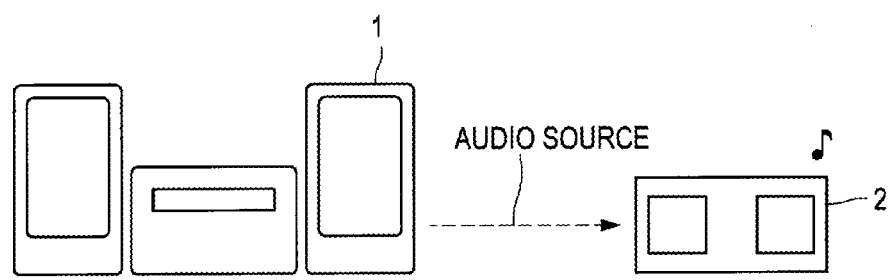
FIG. 5A is an explanatory diagram for illustrating device connection in the audio signal radio transmission technology.

Next, devices connectable with each other in the audio signal radio transmission technology will be described in detail with reference to FIGS. 5A to 5D. FIGS. 5A to 5D are explanatory diagrams for illustrating device connection in the audio signal radio transmission technology. In the audio signal radio transmission technology, for example, as shown in FIG. 5A, a connection can be established only between a parent device and a child device. Between the parent device and the child device where a connection is established, an audio source is transmitted from the parent device to the child device. Note that although FIG. 5A shows only the connection between a parent device 1 and a main child device 2, a connection can also be established between the parent device and a sub-child device.

Figure 5B:
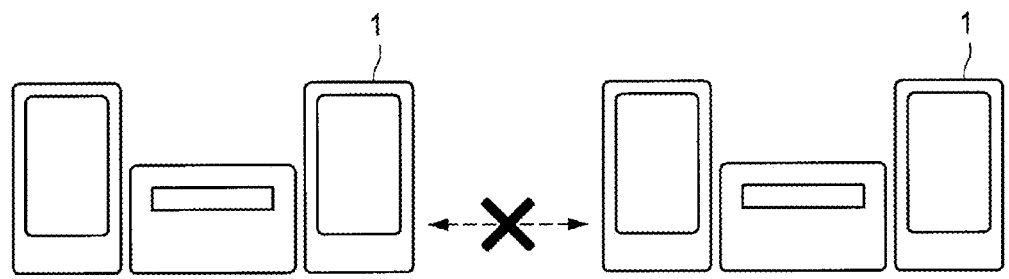
FIG. 5B is an explanatory diagram for illustrating device connection in the audio signal radio transmission technology.
Figure 5C:
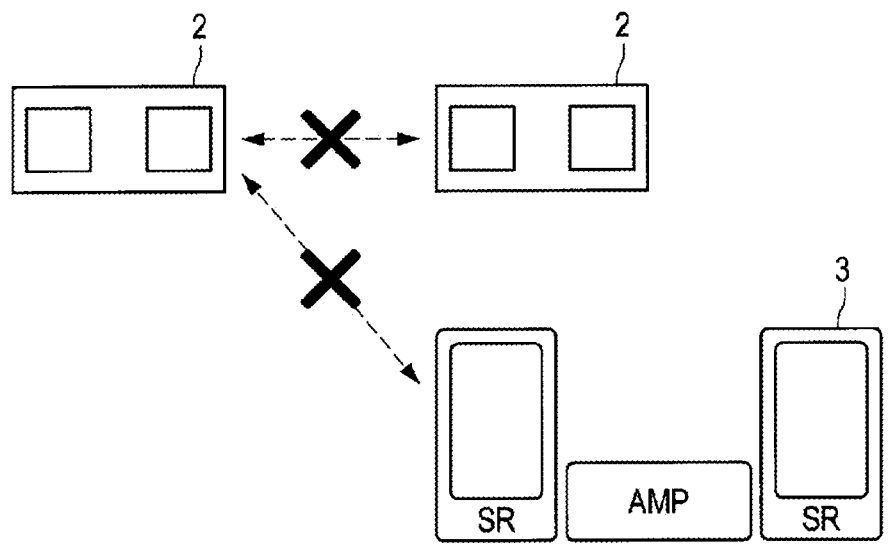
FIG. 5C is an explanatory diagram for illustrating device connection in the audio signal radio transmission technology.

For example, as shown in FIG. 5B, a connection may not be established between a parent device 1 and another parent device 1. Further, for example, as shown in FIG. 5C, a connection may not be established between a main child device 2 and another main child device 2 or between the main child device 2 and a sub-child device 3.

Figure 5D:
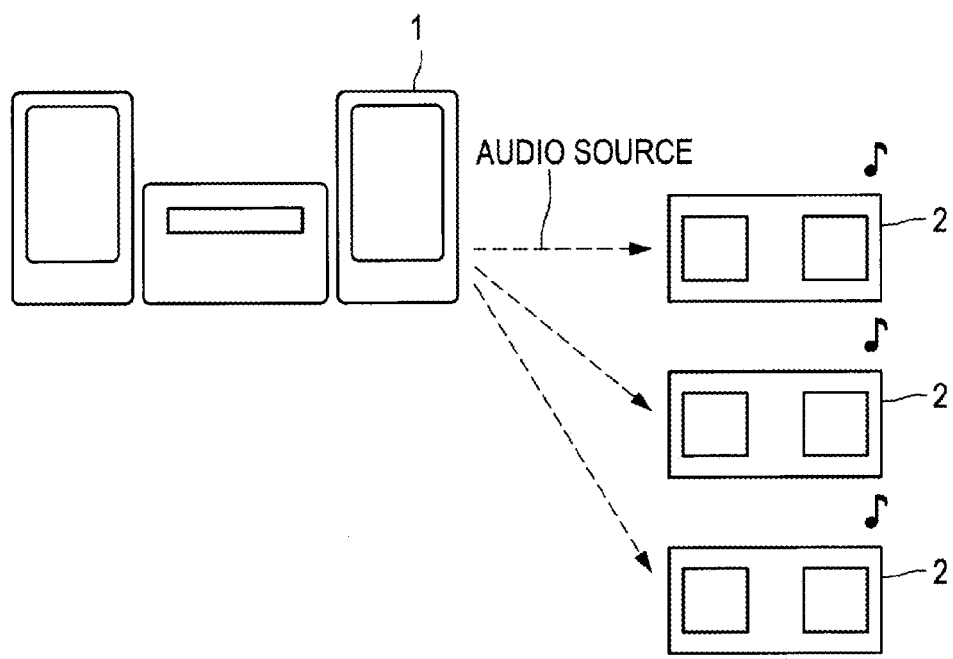
FIG. 5D is an explanatory diagram for illustrating device connection in the audio signal radio transmission technology.

Note that, for example, as shown in FIG. 5D, a plurality of child devices 2 can be connected to one parent device 1 and sounds from the parent device 1 can be output (reproduced) from the respective child devices 2.

That is, in the audio signal radio transmission technology, a child device can reproduce a music source of a parent device to which the child device is connected, and a child device having a display function can display various information transmitted from the parent device. The parent device can handle operations performed on the child device. Furthermore, in the audio signal radio transmission technology, a connection between parent devices and a connection between child devices may not be established.

(Procedure for Device Connection)

In the audio signal radio transmission technology, a connection between a parent device and a child device can be established by a simple procedure and the child device can reproduce music transmitted from the parent device. Specifically, when the power to the parent device is turned on and the power to the child device is turned on, connection control units of the parent device and the child device attempt to establish a link between the parent device and the child device. Here, when the parent device and the child device have the same connection ID, the connection control units of the parent device and the child device complete the connection between the parent device and the child device. When the link is completed, an audio signal reproduction unit of the child device can reproduce a music source that is transmitted from the parent device.

(Regarding Connection ID)

Next, the function of a connection ID will be described in detail with reference to FIGS. 6A and 6B. FIGS. 6A and 6B are explanatory diagrams for illustrating the function of a connection ID in the audio signal radio transmission technology.

A connection ID in the audio signal radio transmission technology is used to establish a connection between a child device and a desired parent device by allowing a connection ID of the child device to match a connection ID of a parent device of which music content is to be listened to (a parent device to which the child device is to be connected). In the audio signal radio transmission technology, a frequency band used for two-way communication is divided into several regions and connection IDs are respectively associated with the divided regions. In the audio signal radio transmission technology, when there are a plurality of parent devices, by distinguishing connection IDs from each other, for example, a maximum of three parent devices can coexist. FIGS. 6A and 6B show a case in which there are three connection IDs A, B, and C.

For example, an example shown in FIG. 6A shows a case in which there are a parent device 1 having a connection ID set to A and two main child devices 2 having connection IDs set to A. When a main child device 2 attempts to establish a connection with the parent device 1, a connection control unit of at least any one of the parent device 1 and the main child device 2 transmits a connection ID set to itself toward a device with which the device intends to establish a connection. A connection control unit of the device having received the connection ID determines whether the connection ID matches a connection ID thereof and determines whether to establish a connection. In the example shown in FIG. 6A, since the parent device 1 and the two main child devices 2 have the same connection ID, the two main child devices 2 each can establish a connection with the parent device 1.

Further, for example, as shown in FIG. 6B, even when a plurality of parent devices 1 are present in the same area, by setting different values to connection IDs of the parent devices 1, the plurality of parent devices 1 can coexist. Note that the number of parent devices that can coexist in the same area changes according to the number of connection IDs. In the examples shown in FIGS. 6A and 6B, since the number of connection IDs is three, the number of parent devices that can coexist in the same area is three at the maximum.

The number of child devices that can be connected to one parent device can be set to any value. For example, setting may be performed to guarantee up to 10 main and sub-child devices at the maximum. Likewise, the number of sub-child devices that can be connected to one subchannel can be set to any value. For example, setting may be performed to allow a maximum of two sub-child devices to be connected to one subchannel.

(Switching Between Connection IDs)

When a parent device and a child device having different connection IDs are present in the same area, at the point in time when the connection IDs of the parent device and the child device are switched, a connection between the parent and the child device is immediately established and the child device reproduces an audio source that is output from the parent device having the same connection ID as the child device.

When a parent device or a child device has a slide switch, such as that shown in FIG. 6A, switching between connection IDs is performed by setting the switch to a desired connection ID. When a parent device or a child device has a display unit, by operating a setting menu, etc., a connection ID of the device can be set in a software manner. When switching between connection IDs is performed, connection control units of respective devices change a frequency band used for two-way communication to a predetermined frequency band, according to the setting.

For example, by switching between connection IDs by a method described above, a child device can reproduce an audio source of a parent device whose connection ID is the same as that selected by the child device.

Although an example of the principal functions of a connection control unit which are provided to at least any one of a parent device and a child device is described above, the functions of the connection control unit are not limited to those described above.

(Regarding Transmission of an Audio Signal Between a Parent Device and a Child Device)

In the following, functions provided to at least any one of a transmission control unit of a parent device which includes a CPU, a ROM, a RAM, a DSP, an external device communication unit, etc., and a transmission control unit of a child device which includes a CPU, a ROM, a RAM, a DSP, an external device communication unit, etc., will be described in detail. Note that the transmission control units of the parent device and the child device may further include a plurality of processing units specialized in respective functions which will be described below.

[Regarding Modes of a Parent Device]

A parent device takes either a surround mode state having one main channel and a maximum of three subchannels, or a multi-source mode state having a maximum of four main channels. In either of the surround mode or multi-source mode, the parent device notifies a child device of channel mapping in establishing a link. The channel mapping is information indicating the types of audio signals transmitted from the parent device on a plurality of channels. Every time there occurs an event which causes the channel mapping of the parent device to be changed, the parent device changes the channel mapping and notifies the child device of the changed channel mapping.

[Surround Mode]

Next, the surround mode which is a mode of a parent device will be described in detail with reference to FIGS. 7A and 7B. FIGS. 7A and 7B are explanatory diagrams for illustrating a mode of a parent device in the audio signal radio transmission technology.

A parent device in the surround mode has one main channel and subchannels of a maximum of three channels. A transmission control unit of the parent device can arbitrarily assign surround sources of the parent device to the respective subchannels.

For example, in FIG. 7A, a stereo output of a main channel is assigned to CH1 and subchannels of three stereo channels are assigned to three channels CH2 to CH4. In the surround mode, as shown in FIG. 7B, for example, an audio signal of front components (L/R components) of a DVD is assigned to CH1 as a main channel and three types of surround signals which are originally recorded on the DVD are assigned to CH2 to CH4. In addition, based on the sound field setting of the parent device, a downmix audio signal of the DVD may be assigned to the main channel and surround components generated by the parent device may be assigned to the subchannels.

[Multi-source Mode]

Next, the multi-source mode which is a mode of a parent device will be described in detail with reference to FIGS. 7C and 7D. FIGS. 7C and 7D are explanatory diagrams for illustrating a mode of a parent device in the audio signal radio transmission technology.

A parent device in the multi-source mode has main channels of a maximum of four channels. A transmission control unit of the parent device can arbitrarily assign main sources of the parent device to the respective main channels.

For example, in FIG. 7C, different main sources can be respectively assigned to four stereo channels CH1 to CH4. In the multi-source mode, for example, as shown in FIG. 7D, an audio signal whose sound source is CD is assigned to CH1, an audio signal whose sound source is TUNER is assigned to CH2, an audio signal whose sound source is DMPORT (Digital Media Port) is assigned to CH3, and an audio signal whose sound source is AUDIO IN is assigned to CH4.

[Regarding Subchannel Types]

Next, an example of subchannels used in the audio signal radio transmission technology will be described with reference to FIG. 8. FIG. 8 is an explanatory diagram for illustrating an example of subchannel types in the audio signal radio transmission technology.

As shown in FIG. 8, a subchannel assigned to a parent device in the surround mode is defined by a two-channel pair. Subchannels used in the audio signal radio transmission technology are not limited to the example shown in FIG. 8, and when a new subchannel is generated the new subchannel can be added any time as a subchannel.

[Audio Signals Reproducible by a Main Child Device]

Next, audio signals reproducible by a main child device 2 will be described in detail with reference to FIG. 9A. FIG. 9A is an explanatory diagram for illustrating audio signals reproducible by a main child device.

The main child device 2 is a child device that is premised on use mainly in ROOM1 (e.g., 2nd ROOM) which is different than MAIN ROOM and can reproduce a main channel of a parent device 1. Therefore, when, as shown in FIG. 9A, a parent device 1 to which the main child device 2 is connected is in the surround mode, the main child device 2 can obtain, by a transmission control unit thereof, audio data (audio signal) of a main channel assigned to CH1 and can reproduce only the main channel of CH1. When a parent device 1 to which the main child device 2 is connected is in the multi-source mode, the main child device 2 can obtain, by the transmission control unit thereof, audio data (audio signals) of main channels assigned to CH1 to CH4 and can reproduce the respective main channels of CH1 to CH4.

Substantially any number of main child devices can be connected to one parent device, and a connection control unit and a transmission control unit of a parent device 1 may guarantee the connection of 10 main child devices.

[Audio Signals Reproducible by a Sub-child Device]

Next, audio signals reproducible by a sub-child device will be described in detail with reference to FIG. 9B. FIG. 9B is an explanatory diagram for illustrating audio signals reproducible by a sub-child device.

A sub-child device is a child device that is premised on use mainly in MAIN ROOM and can reproduce a subchannel of a parent device 1. Therefore, as shown in FIG. 9B, the sub-child device can be connected only to a parent device 1 in the surround mode configured by channel mapping including subchannels, and may not be linked to a parent device 1 in the multi-source mode configured by channel mapping which does not include subchannels.

A subchannel reproducible by a sub-child device is determined according to the function of the sub-child device. For example, as shown in FIG. 9B, a sub-child device 3 having a surround rear (SR) function can receive, by a transmission control unit thereof, only an audio signal whose audio data is SR (surround rear) and reproduce the received audio signal. A sub-child device 4 having a surround back (SRB) function can receive, by a transmission control unit thereof, only an audio signal whose audio data is SRB (surround back) and reproduce the received audio signal.

A connection control unit and a transmission control unit of a parent device can limit the number of sub-child devices that can be connected to one subchannel of one parent device, to a predetermined number (e.g., two).

Although an example of the principal functions of a transmission control unit which are provided to at least any one of a parent device and a child device is described above, the functions of the transmission control unit are not limited to those described above.

<2. Advantages and Disadvantages of the Fundamental Technologies>

DLNA and the audio signal radio transmission technology which are the fundamental technologies of the present invention are described above. DLNA and the audio signal radio transmission technology each have advantages and disadvantages.

Specifically, in DLNA, as described above, once setting for connection authentication is performed between DLNA-compliant devices, the devices can thereafter recognize device(s) with which they can communicate among the corresponding devices. Thus, DLNA has an advantage in, for example, an increase in the degree of flexibility in the selection of a device to reproduce content which is shared between devices constructing a DLNA home network. In addition, as described above, in a DLNA-compliant system, since a list of content is managed by a structure having a folder hierarchy by CDS, there is another advantage in a high degree of flexibility in content selection such as the ability to select a reproduction target in units of content.

Meanwhile, in order to construct a DLNA home network, setting for connection authentication needs to be performed between DLNA-compliant devices. This setting often requires technical knowledge and thus there is a disadvantage in that operations for the setting are cumbersome to a user. In addition, in a DLNA-compliant system, since various pieces of content are managed by the aforementioned hierarchical structure, there is another disadvantage in that it may become difficult for the user to search for or select content to be reproduced.

On the other hand, some of technologies having a communication standard that is not compatible with DLNA, such as the above-described audio signal radio transmission technology, have advantages in easiness of connection authentication and easiness of search and selection of content so that the above-described issues are solved.

However, a communication standard used in a DLNA home network and a communication standard used in the above-described audio signal radio transmission technology are not compatible with each other. Therefore, in each of DLNA and the audio signal radio transmission technology, a connection can be established only between devices that comply with a corresponding communication standard and thus the advantages of the respective standards may not be made use of.

In light of the forgoing, in a content reproduction system according to an embodiment of the present invention, a device corresponding to a DMR in the 3-box model of DLNA is provided with a function of mutually interpreting and converting data conforming to a communication standard in DLNA and data conforming to a communication standard different than DLNA. A content reproduction system, apparatuses that constitute the system, and a method of reproducing content in the system, according to the embodiment of the present invention will be described in detail below.

<3. Embodiment of the Present Invention>

[Content Reproduction System 1]

Figure 10:
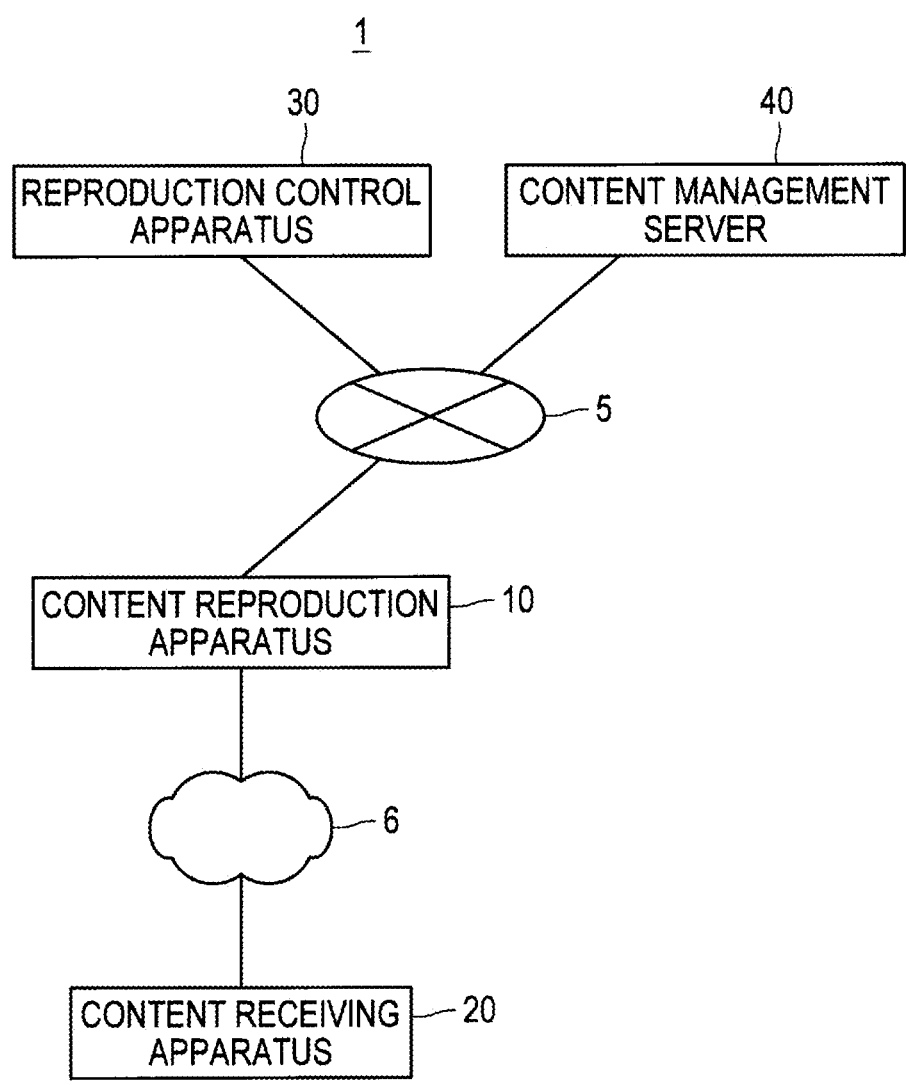
FIG. 10 is an explanatory diagram showing an overall configuration of a content reproduction system according to an embodiment of the present invention.

First, an overall configuration of a content reproduction system according to an embodiment of the present invention will be described with reference to FIG. 10. FIG. 10 is an explanatory diagram showing an overall configuration of a content reproduction system according to the embodiment of the present invention.

As shown in FIG. 10, a content reproduction system 1 according to the present embodiment mainly includes a communication network 5, a radio communication network 6, a content reproduction apparatus 10, a content receiving apparatus 20, a reproduction control apparatus 30, and a content management server 40.

The communication network 5 is an example of a communication network over which data communication is performed based on a first communication standard according to the present embodiment. The communication network 5 is a communication line network that establishes a connection between the content management server 40, the reproduction control apparatus 30, and the content reproduction apparatus 10 such that they can perform two-way communication or one-way communication. The communication network 5 includes, for example, public switched telephone networks such as the Internet, an NGN (Next Generation Network), a telephone network, a satellite communication network, and a broadcast communication channel and leased line networks such as a WAN (Wide Area Network), a LAN (Local Area Network), an IP-VPN (Internet Protocol-Virtual Private Network), Ethernet (registered trademark), and a wireless LAN. It does not matter whether the communication network 5 is wired or wireless.

The radio communication network 6 is an example of a communication network over which data communication is performed based on a second communication standard according to the present embodiment which is different than the communication standard used in the communication network 5. The radio communication network 6 is a communication line network that establishes a connection between the content reproduction apparatus 10 and the content receiving apparatus 20 such that they can perform two-way communication or one-way communication. The radio communication network 6 includes, for example, communication line networks defined by unique standards of a radio communication network with a radio wave band and the like. The radio communication network 6 is not compatible with Bluetooth (registered trademark) or wireless LANs (IEEE 802.11b/g, etc.). A communication standard used in the radio communication network 6 includes, specifically, a communication standard used in the above-described audio signal radio transmission technology. Namely, in the radio communication network 6, for example, communication may be performed by a communication standard that realizes data transmission by radio communication with a 2.4 GHz-band using a plurality of channels which are paths for transmitting data including audio signals. Note that data to be transmitted using the channels in this case may include, for example, control signals that control the operations of the content reproduction apparatus 10 and the content receiving apparatus 20.

The content reproduction apparatus 10 is an apparatus that obtains content data corresponding to content specified by the reproduction control apparatus 30 from the content management server 40 over the communication network 5 and reproduces the content data. The content reproduction apparatus 10 also converts data communicated with the content management server 40 or the reproduction control apparatus 30 into data can be communicated with the content receiving apparatus 20 and transmits the converted data to the content receiving apparatus 20 over the radio communication network 6. The content reproduction apparatus 10 may be a computer device such as a personal computer or a server or may be an information home appliance having a communication function over a network, such as a television receiver, a DVD/HDD recorder, a mobile phone, a PDA, a digital camera, a home-use game machine, or a digital video camera. Alternatively, the content reproduction apparatus 10 may be a portable device which can be easily carried by a contractor, e.g., a portable game machine, a PHS, a portable video/audio player, etc.

Note that the content reproduction apparatus 10 has the function of a Digital Media Renderer (DMR) which complies with the DLNA guidelines. The content reproduction apparatus 10 may also have the function of a Digital Media Server (DMS) or a Digital Media Player (DMP). Furthermore, the content reproduction apparatus 10 has functionality as a parent device in the above-described audio signal radio transmission technology.

The content receiving apparatus 20 is an apparatus that receives content data transmitted from the content reproduction apparatus 10 over the radio communication network 6 and reproduces the received content data. The content data received by the content receiving apparatus 20 is transmitted, for example, in the form of an audio signal, etc., using a channel which is a path for transmitting an audio signal, data, etc., in the radio communication network 6. The content receiving apparatus 20 also transmits to the content reproduction apparatus 10 various information, such as information about the connection of the content receiving apparatus 20 and a notification requesting to change an audio signal to be transmitted. The content receiving apparatus 20 may be a surround speaker group which is wirelessly connected to the content reproduction apparatus 10 or may be a device such as an audio component that outputs an audio signal transmitted from the content reproduction apparatus 10. Alternatively, the content receiving apparatus 20 may be a device such as headphones or earphones. Note that the content receiving apparatus 20 has functionality as a child device (a main child device or sub-child device) in the above-described audio signal radio transmission technology.

The reproduction control apparatus 30 is an apparatus that can obtain a list of content such as video content, music content, or photo content from the content management server 40 and send out a reproduction control signal to the content reproduction apparatus 10 which will be described later, to cause the content reproduction apparatus 10 to reproduce content selected from the list of content. The reproduction control apparatus 30 may be a computer device such as a personal computer or a server or may be an information home appliance having a communication function over a network, such as a television receiver, a DVD/HDD recorder, a mobile phone, a PDA (Personal Digital Assistant), a digital camera, a home-use game machine, or a digital video camera. Alternatively, the reproduction control apparatus 30 may be a portable device which can be easily carried by a contractor, e.g., a portable game machine, a PHS, a portable video/audio player, etc. Note that the reproduction control apparatus 30 has the function of a Digital Media Controller (DMC) which complies with the DLNA (Digital Living Network Alliance) guidelines.

The content management server 40 manages content such as video content, music content, and photo content such that each piece of content is associated with its location information, meta-data, etc. The content management server 40 also provides content, meta-data of content, etc., managed by the content management server 40, in response to a request from the reproduction control apparatus 30 or the content reproduction apparatus 10 which is connected thereto over the communication network 5. The content management server 40 may be a computer device such as a personal computer or a server or may be an information home appliance having a communication function over a network, such as a television receiver, a DVD/HDD recorder, a mobile phone, a PDA (Personal Digital Assistant), a digital camera, a home-use game machine, or a digital video camera. Alternatively, the content management server 40 may be a portable device which can be easily carried by a contractor, e.g., a portable game machine, a PHS, a portable video/audio player, etc. Note that the content management server 40 has the function of a Digital Media Server (DMS) which complies with the DLNA guidelines.

Although in the example shown in FIG. 10 only one the content reproduction apparatus 10, one reproduction control apparatus 30, and one content management server 40 are connected to the communication network 5, a plurality of content reproduction apparatuses 10, a plurality of reproduction control apparatuses 30, and a plurality of content management servers 40 may be connected to the communication network 5. Likewise, although in the example shown in FIG. 10 one content receiving apparatus 20 is connected to the content reproduction apparatus 10 over the radio communication network 6, a plurality of content receiving apparatuses 20 may be connected to one content reproduction apparatus 10.

Further, although in the example shown in FIG. 10 the content reproduction apparatus 10, the reproduction control apparatus 30, and the content management server 40 are connected to one another over the communication network 5, the content reproduction apparatus 10, the reproduction control apparatus 30, and the content management server 40 may be directly connected to one another instead of over the communication network 5.

The content reproduction apparatus 10, the content receiving apparatus 20, the reproduction control apparatus 30, and the content management server 40 will be described in detail again below.

[Configuration of the Content Reproduction Apparatus 10]

Figure 11:
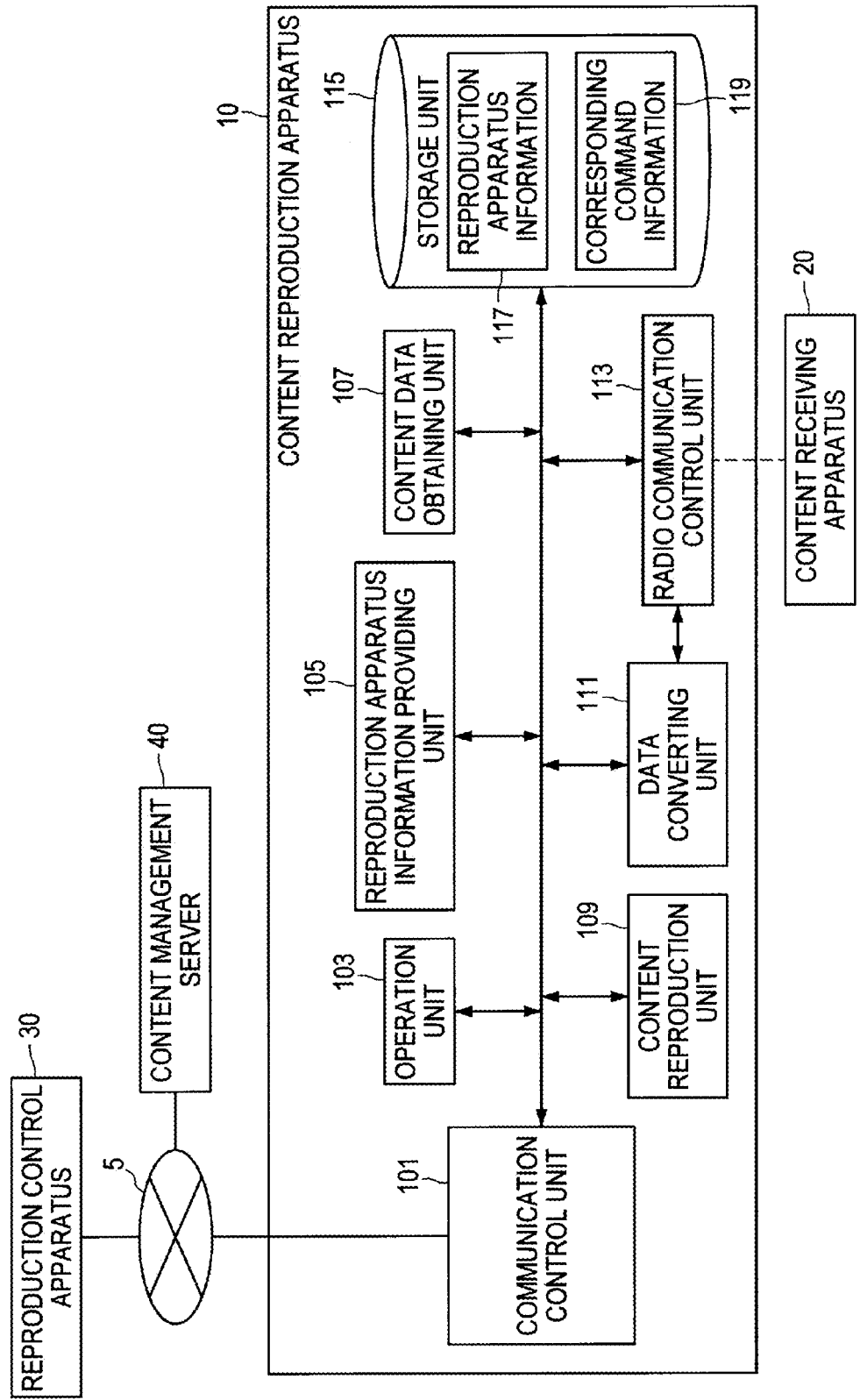
FIG. 11 is a block diagram showing a functional configuration of a content reproduction apparatus according to the embodiment.

Next, a configuration of a content reproduction apparatus according to the present embodiment will be described in detail with reference to FIG. 11. FIG. 11 is a block diagram showing a functional configuration of a content reproduction apparatus according to the present embodiment.

As shown in FIG. 11, a content reproduction apparatus 10 mainly includes a communication control unit 101, an operation unit 103, a reproduction apparatus information providing unit 105, a content data obtaining unit 107, a content reproduction unit 109, a data converting unit 111, a radio communication control unit 113, and a storage unit 115.

The communication control unit 101 includes, for example, a CPU (Central Processing Unit), a ROM (Read Only Memory), a RAM (Random Access Memory), and a communication device. The communication control unit 101 performs communication control of various data to be transmitted and received between the content reproduction apparatus 10 and a reproduction control apparatus 30 and between the content reproduction apparatus 10 and a content management server 40.

More specifically, the communication control unit 101 transmits various data or signals to the reproduction control apparatus 30 or the content management server 40, in response to a request from any of processing units included in the content reproduction apparatus 10 according to the present embodiment. Further, the communication control unit 101 receives various data or signals transmitted from the reproduction control apparatus 30 or the content management server 40, and transmits the received data or signals to an appropriate processing unit included in the content reproduction apparatus 10 according to the present embodiment.

The communication control unit 101 also serves as a reproduction request receiving unit according to the present embodiment, as part of its functionality. Specifically, the communication control unit 101 receives from the reproduction control apparatus 30 a control signal indicating a request to obtain and reproduce content data selected by the reproduction control apparatus 30. Then, the communication control unit 101 transmits the received control signal to the content data obtaining unit 107 and the content reproduction unit 109.

Note that the communication control unit 101 can use the storage unit 115 which will be described later, as a transmission and reception buffer.

The operation unit 103 includes, for example, a CPU, a ROM, a RAM, and an input device. The operation unit 103 converts an operation performed on various input switches such as a content selection switch, a reproduction switch, and a stop switch which are provided to the content reproduction apparatus 10, into a predetermined signal and transmits the signal to an appropriate processing unit.

The reproduction apparatus information providing unit 105 includes, for example, a CPU, a ROM, and a RAM. The reproduction apparatus information providing unit 105 transmits to the reproduction control apparatus 30 reproduction apparatus information including reproduction apparatus identification information for identifying the content reproduction apparatus 10 and attribute information which includes the types of content reproducible on the content reproduction apparatus 10, etc. The reproduction apparatus identification information is information specific for the content reproduction apparatus 10 and includes identification information, e.g., an IP address provided to the content reproduction apparatus 10, the manufacturer name and device model name of the content reproduction apparatus 10, a UUID provided to the content reproduction apparatus 10, etc. More specifically, the reproduction apparatus information providing unit 105 transmits reproduction apparatus information obtained from the storage unit 115 which will be described later, to the reproduction control apparatus 30 as a response to a content reproduction apparatus discovery protocol which is broadcast by the reproduction control apparatus 30 over a communication network 5.

The content data obtaining unit 107 includes, for example, a CPU, a ROM, and a RAM. The content data obtaining unit 107 obtains, based on reproduction content attribute information transmitted from the reproduction control apparatus 30, content data corresponding to content identified by the reproduction content attribute information from the content management server 40. Here, the reproduction content attribute information is attribute information about content that is determined by the reproduction control apparatus 30 to be reproduced on the content reproduction apparatus 10. The reproduction content attribute information includes attribute information, e.g., identification information about a server that manages content to be reproduced on the content reproduction apparatus 10, information about a title, content size, and content length, a URL to access the content, etc.

Further, the content data obtaining unit 107 transmits content data obtained from the content management server 40, to the content reproduction unit 109 which will be described later. The content data obtaining unit 107 may store the obtained content data in the storage unit 115 which will be described later.

The content reproduction unit 109 performs a reproduction processing of content data transmitted from the content data obtaining unit 107. Note that the content reproduction unit 109 can use data, a database, etc., recorded in the storage unit 115 which will be described later, etc.

The data converting unit 111 includes, for example, a CPU, a ROM, and a RAM. The data converting unit 111 converts data which can be transmitted according to a communication standard (hereinafter, referred to as the "communication standard A") used in the communication network 5 into data which can be transmitted according to a communication standard (hereinafter, referred to as the "communication standard B") used in a radio communication network 6.

More specifically, the data converting unit 111 converts various data received by the communication control unit 101 from the reproduction control apparatus 30 and the content management server 40 into data which can be transmitted according to the communication standard B and transmits the converted data to the radio communication control unit 113. For example, the case will be considered in which content being reproduced on the content reproduction apparatus 10 is to be reproduced on a content receiving apparatus 20, too. In this case, the data converting unit 111 converts reproduction control information (data which can be transmitted according to the communication standard A) which is necessary to control the reproduction of content selected by the reproduction control apparatus 30, into data which can be transmitted (interpreted) according to the communication standard B and outputs the converted reproduction control information to the radio communication control unit 113. The radio communication control unit 113 transmits the converted reproduction control information which is input from the data converting unit 111, to the content receiving apparatus 20.

Further, the data converting unit 111 converts various data received by the radio communication control unit 113 from the content receiving apparatus 20 into data which can be transmitted according to the communication standard A and transmits the converted data to the communication control unit 101 and the content reproduction unit 109. Data received by the radio communication control unit 113 from the content receiving apparatus 20 includes, for example, a processing instruction signal for causing the content reproduction apparatus 10 to perform a predetermined processing (a processing related to an operation of a running system such as reproduce, stop, fast forward, or rewind of content, a sound volume adjustment processing, etc.). In this case, the data converting unit 111 converts a processing instruction signal transmitted from the radio communication unit 113 into data which can be transmitted (interpreted) according to the communication standard A and outputs the converted processing instruction signal to the content reproduction unit 109. Based on the converted processing instruction signal which is input from the data converting unit 111, the content reproduction unit 109 performs a corresponding processing (processing related to an operation of a running system such as reproduce, stop, fast forward, or rewind of content, a sound volume adjustment processing, etc.).

Here, in the storage unit 115 which will be described later, is stored corresponding command information 119 which includes predetermined control information (hereinafter, referred to as "commands") which can be transmitted according to the communication standard A, predetermined commands which can be transmitted according to the communication standard B, and a correspondence relationship between these commands. The data converting unit 111 interprets data which can be transmitted according to the communication standard A and data which can be transmitted according to the communication standard B by referring to the correspondence command information 119 and mutually converts these data which can be transmitted according to the different communication standards. Note that, for the correspondence command information 119, one that is stored in the storage unit 115 of the content reproduction apparatus 10 may be referred to or correspondence command information may be obtained from an external device over the communication network 5, etc.

Thus, in the content reproduction apparatus 10 according to the present embodiment, by the providing the data converting unit 111, data communication between devices with different communication standards is realized and thus mutual control between the devices with different communication standards is realized. Accordingly, devices complying with communication standards which are not compatible with each other, e.g., DLNA and the audio signal radio transmission technology, can be indirectly connected to each other through the content reproduction apparatus 10, whereby the advantages of the respective standards can be made use of. Namely, according to the present embodiment, while the advantages of DLNA are made use of, the setting of the connection between devices and selection of content can be facilitated.

Instead of providing only one data converting unit 111, a plurality of data converting units 111 may be provided. At this time, when there are a plurality of content receiving apparatuses 20, each of the plurality of data converting units 111 may receive data units from the content receiving apparatuses 20 which are different from each other. Particularly, it is preferred that one data converting unit 111 and one content receiving apparatus 20 which can communicate with the one data converting unit 111 have a one-to-one correspondence through a radio communication control unit 113 which will be described later.

For example, since the above-described audio signal radio transmission technology has a unique communication standard, when the content reproduction apparatus 10 and the content receiving apparatus 20 are devices that comply with the audio signal radio transmission technology, the devices do not recognize each other as IP devices. However, as described above, when one data converting unit 111 and one content receiving apparatus 20 which can communicate with the one data converting unit 111 have a one-to-one correspondence, the reproduction control apparatus 30 that can communicate with the one data converting unit 111 can identify the content receiving apparatus 20 linked to the one data converting unit 111. That is, the content receiving apparatus 20 linked to the one data converting unit 111 is identified as if the content receiving apparatus 20 were an IP device.

Furthermore, when there are a plurality of data converting units 111, data transmission may be realized between one data converting unit 111 and another data converting unit 111. Accordingly, when there are a plurality of content receiving apparatuses 20, one content receiving apparatus 20 can control, through one data converting unit 111 to which the one content receiving apparatus 20 is linked, the operation of a content receiving apparatus 20 linked to another data converting unit 111. More specifically, for example, first, one content receiving apparatus 20 transmits a control signal to one data converting unit 111 to which the one content receiving apparatus 20 is linked. Then, the one data converting unit 111 transmits the received control signal to another data converting unit 111. Furthermore, another data converting unit 111 transmits the control signal transmitted from the one data converting unit 111, to another content receiving apparatus 20 to which another data converting unit 111 is linked. Another content receiving apparatus 20 having received the control signal transmitted from the one content receiving apparatus 20 performs a predetermined processing based on the control signal. In this manner, one content receiving apparatus 20 can control another content receiving apparatus 20 to perform a predetermined processing.

The radio communication control unit 113 includes, for example, a CPU, a ROM, a RAM, and a communication device. The radio communication control unit 113 performs communication control of various data to be transmitted and received between the content reproduction apparatus 10 and the content receiving apparatus 20.

More specifically, the radio communication control unit 113 transmits various data or signals to the content receiving apparatus 20, in response to a request from any of processing units, such as the data converting unit 111, included in the content reproduction apparatus 10 according to the present embodiment. Further, the radio communication control unit 113 receives various data or signals transmitted from the content receiving apparatus 20 and transmits the received data or signals to the data converting unit 111.

The radio communication control unit 113 also serves as a converted data transmitting unit according to the present embodiment, as part of its functionality. Specifically, the radio communication control unit 113 transmits data which is converted by the data converting unit 111 into a format that allows communication over the radio communication network 6, to the content receiving apparatus 20 over the radio communication network 6. The data converted into a format that allows communication over the radio communication network 6 includes, for example, a sound volume control signal for adjusting by the reproduction control apparatus 30 the reproduction sound volume of content on the content receiving apparatus 20, which is converted into a format that allows communication over the radio communication network 6.

Note that the radio communication control unit 113 can use the storage unit 115 which will be described later, as a transmission and reception buffer.

Figure 12:
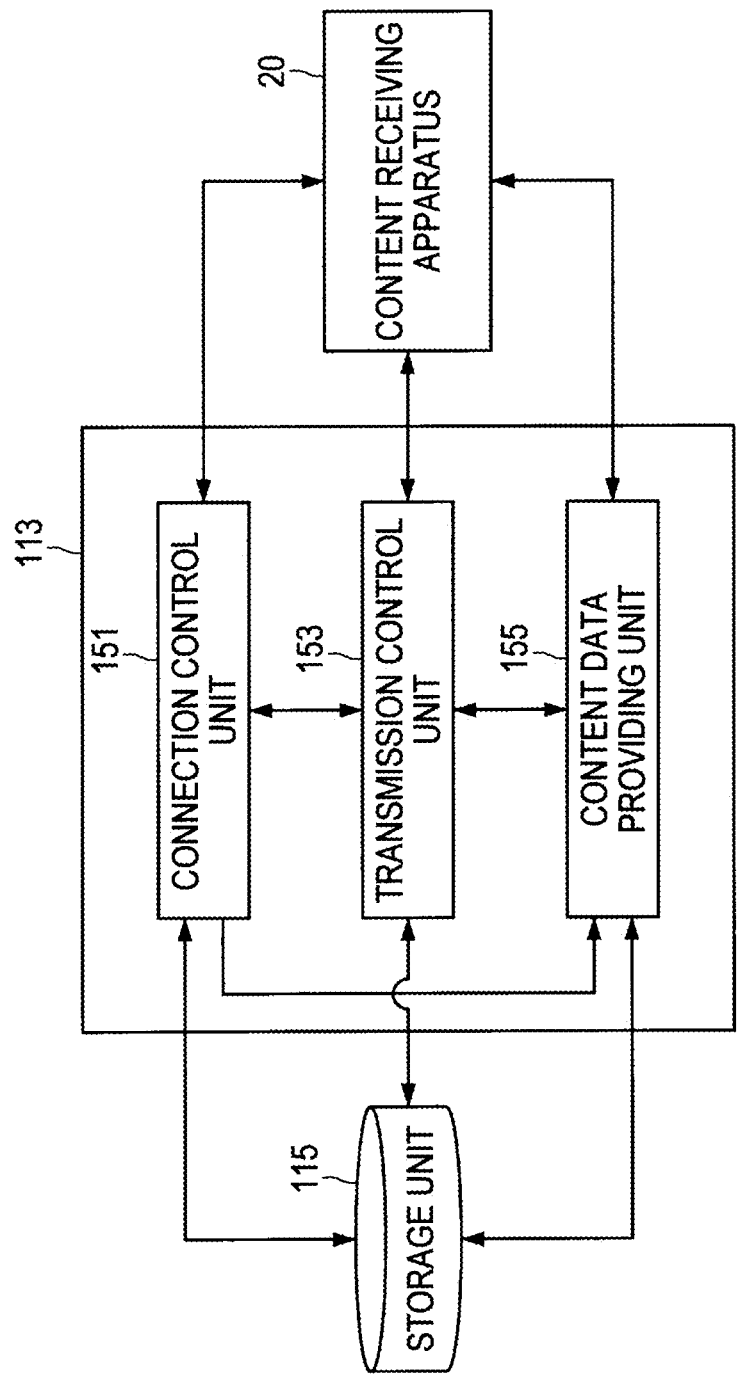
FIG. 12 is a block diagram showing a functional configuration of a radio communication control unit of the content reproduction apparatus according to the embodiment.

Now, a more detailed configuration of the radio communication control unit 113 will be described with reference to FIG. 12. FIG. 12 is a block diagram showing a functional configuration of the radio communication control unit 113 according to the present embodiment. Note that although FIG. 12 shows an example case in which the radio communication control unit 113 according to the present embodiment has functionality as a parent device in the above-described audio signal radio transmission technology which is the fundamental technologies of the present invention, the radio communication control unit 113 is not limited to the one having such functionality.

As shown in FIG. 12, the radio communication control unit 113 mainly includes a connection control unit 151, a transmission control unit 153, and a content data providing unit 155.

The connection control unit 151 includes a CPU, a ROM, a RAM, a radio communication device, etc. The connection control unit 151 performs connection control of an external connection device such as the content receiving apparatus 20 connected to the content reproduction apparatus 10. When the connection control unit 151 receives a connection establishment request transmitted from an external connection device such as the content receiving apparatus 20, the connection control unit 151 determines whether to allow a connection. If determining to allow establishment of a connection, then the connection control unit 151 establishes a connection with the external connection device. When the connection control unit 151 receives a connection release request transmitted from an external connection device such as the content receiving apparatus 20, the connection control unit 151 resets the connection with the external connection device. Further, the connection control unit 151 grasps the number and operating conditions of external connection devices connectable to the content reproduction apparatus 10 over the radio communication network 6 based on operating condition information about the operating conditions of the content receiving apparatus 20, and thereby performs connection management.

Specifically, the connection control unit 151 controls the connection of an external connection device according to whether there is an external connection device connectable to the content reproduction apparatus 10 (e.g., an external connection device such as the content receiving apparatus 20 according to the present embodiment or headphones connected to the content reproduction apparatus 10 and/or the content receiving apparatus 20) and according to the operating conditions of the external connection device.

The transmission control unit 153 includes a CPU, a ROM, a RAM, a radio communication device, etc. The transmission control unit 153 controls transmission of content data (e.g., an audio signal) between the content reproduction apparatus 10 and the content receiving apparatus 20. More specifically, the transmission control unit 153 generates new CH mapping information (see the above-described fundamental technologies) in response to a request from the connection control unit 151. In generating new CH mapping information, the transmission control unit 153 dynamically generates CH mapping information so as to reflect a change in the connection state of the content receiving apparatus 20 which is an external connection device or various requests from the content receiving apparatus 20, by referring to, for example, various databases stored in the storage unit 115 which will be described later, or various information transmitted from the connection control unit 151. The generated new CH mapping information is output to the content data providing unit 155 which will be described later, and is transmitted to the content receiving apparatus 20. The newly generated CH mapping information may be recorded in the storage unit 115.

Further, the transmission control unit 153 may transmit to the content receiving apparatus 20 sound source information including sound source type information indicating the sound source types of audio signals transmitted on each of a plurality of channels and external connection device reproduction sound source information indicating the sound source type of an audio signal being reproduced on an external connection device.

In order for the transmission control unit 153 to thus transmit sound source information to the content receiving apparatus 20, the data converting unit 111 prefers to recognize a data transmission scheme for content data such as an audio signal being reproduced on the content reproduction apparatus 10. Otherwise, the data converting unit 111 may not transmit sound source type information, external connection device reproduction sound source information, etc., to the transmission control unit 153. From such a point of view, the data converting unit 111 may have functionality as a transmission scheme determining unit that determines whether the data transmission scheme of the content reproduction apparatus 10 is a first transmission scheme or a second transmission scheme. For the first transmission scheme in this case, there is, for example, a data transmission scheme (multi-source mode) according to which audio signals of different sound source types are transmitted on each of a plurality of channels. For the second transmission scheme, there is a data transmission scheme (surround mode) according to which audio signals of the same sound source type are transmitted on each of a plurality of channels.

The content data providing unit 155 includes, for example, a CPU, a ROM, a RAM, and a radio communication device. The content data providing unit 155 allocates content data such as audio signals to respective channels based on channel (CH) mapping information transmitted from the transmission control unit 153, and transmits the content data to the content receiving apparatus 20. The content data such as audio signals transmitted from the content data providing unit 155 may be obtained from the content management server 40 which is connected to the content reproduction apparatus 10 or may be those recorded in the storage unit 115 which will be described later.

The functions of the radio communication control unit 113 such as those described above may be implemented in a program which is recorded in a storage device provided in the content reproduction apparatus 10 or may be implemented in a program which is recorded in a removable recording medium such as a USB memory.

In the storage unit 115 is stored reproduction apparatus information 117 including reproduction apparatus identification information for identifying the content reproduction apparatus 10 and attribute information which includes the types of content reproducible on the content reproduction apparatus 10, etc. In addition, in the storage unit 115 is stored correspondence command information 119 including predetermined commands which can be transmitted according to the communication standard A, predetermined commands which can be transmitted according to the communication standard B, and a correspondence relationship between these commands.

In addition, in the storage unit 115 are stored, for example, a database in which the types of audio signals forming CH mapping information, etc., are recorded, various transmission information that can be transmitted to the content receiving apparatus 20, and various programs and processing methods which are used by the content reproduction apparatus 10 according to the present embodiment. In addition, pieces of content such as audio signals themselves may be recorded in the storage unit 115.

Furthermore, in the storage unit 115, various parameters, midway progress of a processing, etc., which are needed to be saved when the content reproduction apparatus 10 according to the present embodiment performs some processing, various databases, or the like, may be appropriately recorded. The communication control unit 101, the operation unit 103, the reproduction apparatus information providing unit 105, the content data obtaining unit 107, the content reproduction unit 109, the data converting unit 111, the radio communication control unit 113, etc., can freely perform a read and a write on the storage unit 115.

An example of the functions of the content reproduction apparatus 10 according to the present embodiment is shown above. Each of the above-described components may be configured using a generic member or circuit or may be configured by hardware dedicated for the function of each component. Alternatively, all the functions of the components may be performed by a CPU, etc. Thus, a configuration to be used can be appropriately changed according to the technical level available at the time when the present embodiment is implemented.

[Configuration of the Content Receiving Apparatus 20]

Figure 13:
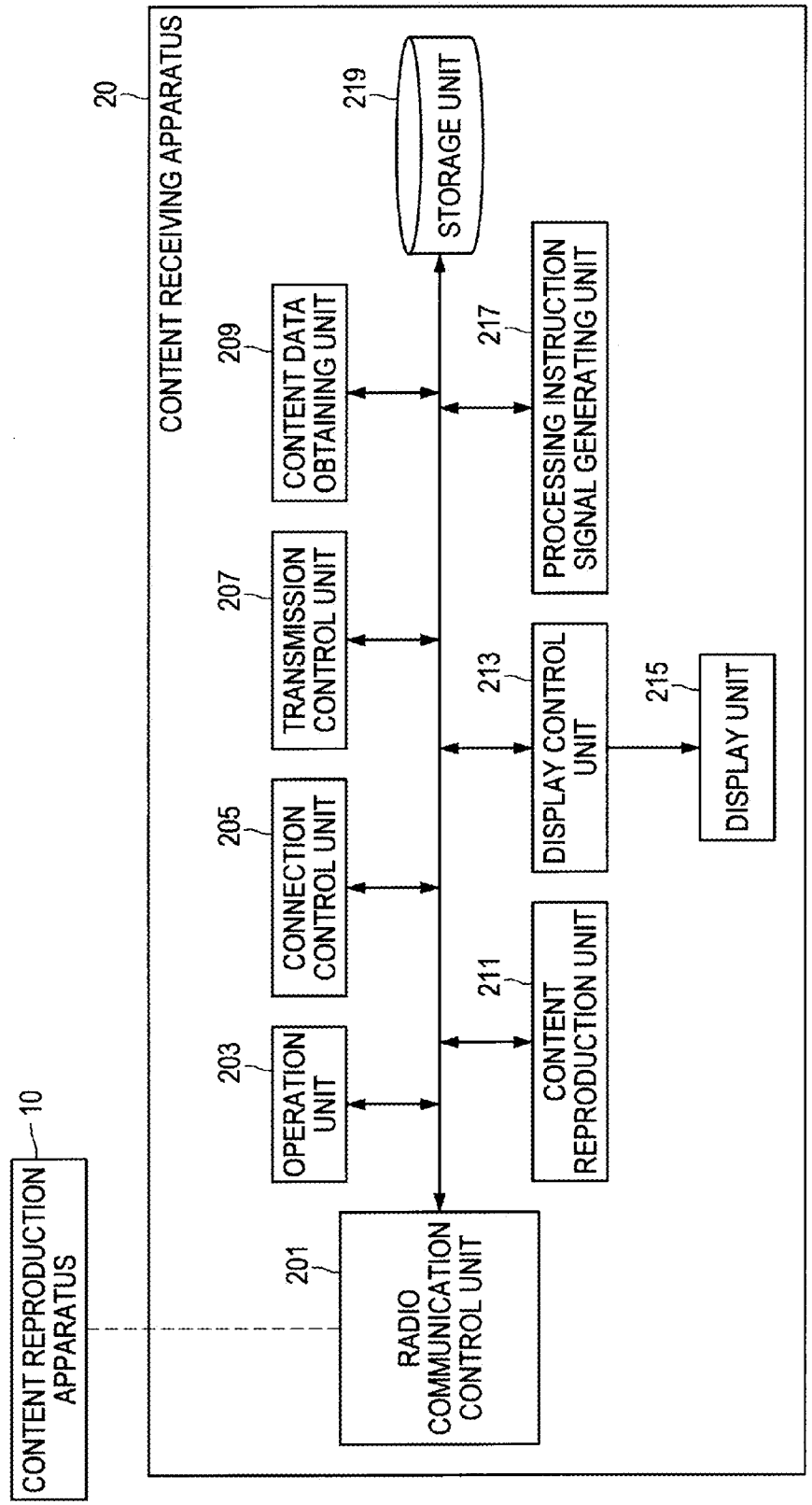
FIG. 13 is a block diagram showing a functional configuration of a content receiving apparatus according to the embodiment.

Next, a configuration of a content receiving apparatus according to the present embodiment will be described in detail with reference to FIG. 13. FIG. 13 is a block diagram showing a functional configuration of a content receiving apparatus according to the present embodiment.

As shown in FIG. 13, a content receiving apparatus 20 mainly includes a radio communication control unit 201, an operation unit 203, a connection control unit 205, a transmission control unit 207, a content data obtaining unit 209, a content reproduction unit 211, a display control unit 213, a display unit 215, a processing instruction signal generating unit 217, and a storage unit 219.

The radio communication control unit 201 includes, for example, a CPU, a ROM, a RAM, and a communication device. The radio communication control unit 201 performs communication control of various data to be transmitted and received between the content receiving apparatus 20 and a content reproduction apparatus 10.

More specifically, the radio communication control unit 201 transmits various data or signals to the content reproduction apparatus 10, in response to a request from any of processing units included in the content receiving apparatus 20 according to the present embodiment. Further, the radio communication control unit 201 receives various data or signals transmitted from the content reproduction apparatus 10, and transmits the received data or signals to an appropriate processing unit included in the content receiving apparatus 20.

The radio communication control unit 201 also serves as a processing instruction signal transmitting unit according to the present embodiment, as part of its functionality. Specifically, the radio communication control unit 201 transmits a processing instruction signal generated by the processing instruction signal generating unit 217 which will be described later, to the content reproduction apparatus 10 over the radio communication network 6. The radio communication control unit 201 also serves as a control signal receiving unit according to the present embodiment, as part of its functionality. Specifically, the radio communication control unit 201 receives a sound volume control signal for adjusting the reproduction sound volume of content data on the content receiving apparatus 20, from the reproduction control apparatus 30 through the content reproduction apparatus 10. Note that the sound volume control signal received by the radio communication control unit 201 is a signal that is changed into data which can be transmitted according to the communication standard B.

Note that the radio communication control unit 201 can use the storage unit 219 which will be described later, as a transmission and reception buffer.

The operation unit 203 includes, for example, a CPU, a ROM, a RAM, and an input device. The operation unit 203 converts an operation performed on various input switches such as a content selection switch, a reproduction switch, and a stop switch which are provided to the content receiving apparatus 20, into a predetermined signal and transmits the signal to an appropriate processing unit.

The connection control unit 205 includes a CPU, a ROM, a RAM, a radio communication device, etc. The connection control unit 205 performs connection control between the content receiving apparatus 20 and the content reproduction apparatus 10. More specifically, the connection control unit 205 transmits to the content reproduction apparatus 10 connection information for changing a connection state between the content receiving apparatus 20 and the content reproduction apparatus 10. Here, the connection information for changing a connection state includes, for example, a connection establishment request from the content receiving apparatus 20 to the content reproduction apparatus 10, a connection release request from the content receiving apparatus 20 to the content reproduction apparatus 10, and information notifying of the ON/OFF power state of the content receiving apparatus 20.

The connection control unit 205 may also transmit an identifier which identifies the content receiving apparatus 20, etc., when transmitting the connection information to the content reproduction apparatus 10.

Note that the connection control unit 205 according to the present embodiment can further perform, in addition to the above-described processing, processing as a connection control unit included in a child device in the audio signal radio transmission technology according to the fundamental technologies of the present invention.

The transmission control unit 207 includes, for example, a CPU, a ROM, a RAM, and a radio communication device. The transmission control unit 207 performs control for when receiving content data such as an audio signal transmitted from the content reproduction apparatus 10. Further, the transmission control unit 207 performs transmission control of various transmission commands which are transmitted to the content reproduction apparatus 10 when the content receiving apparatus 20 controls the content reproduction apparatus 10.

Note that the transmission control unit 207 according to the present embodiment can further perform, in addition to the above-described process, a process as a transmission control unit included in a child device in the audio signal radio transmission technology according to the fundamental technologies of the present invention.

Figure 14:
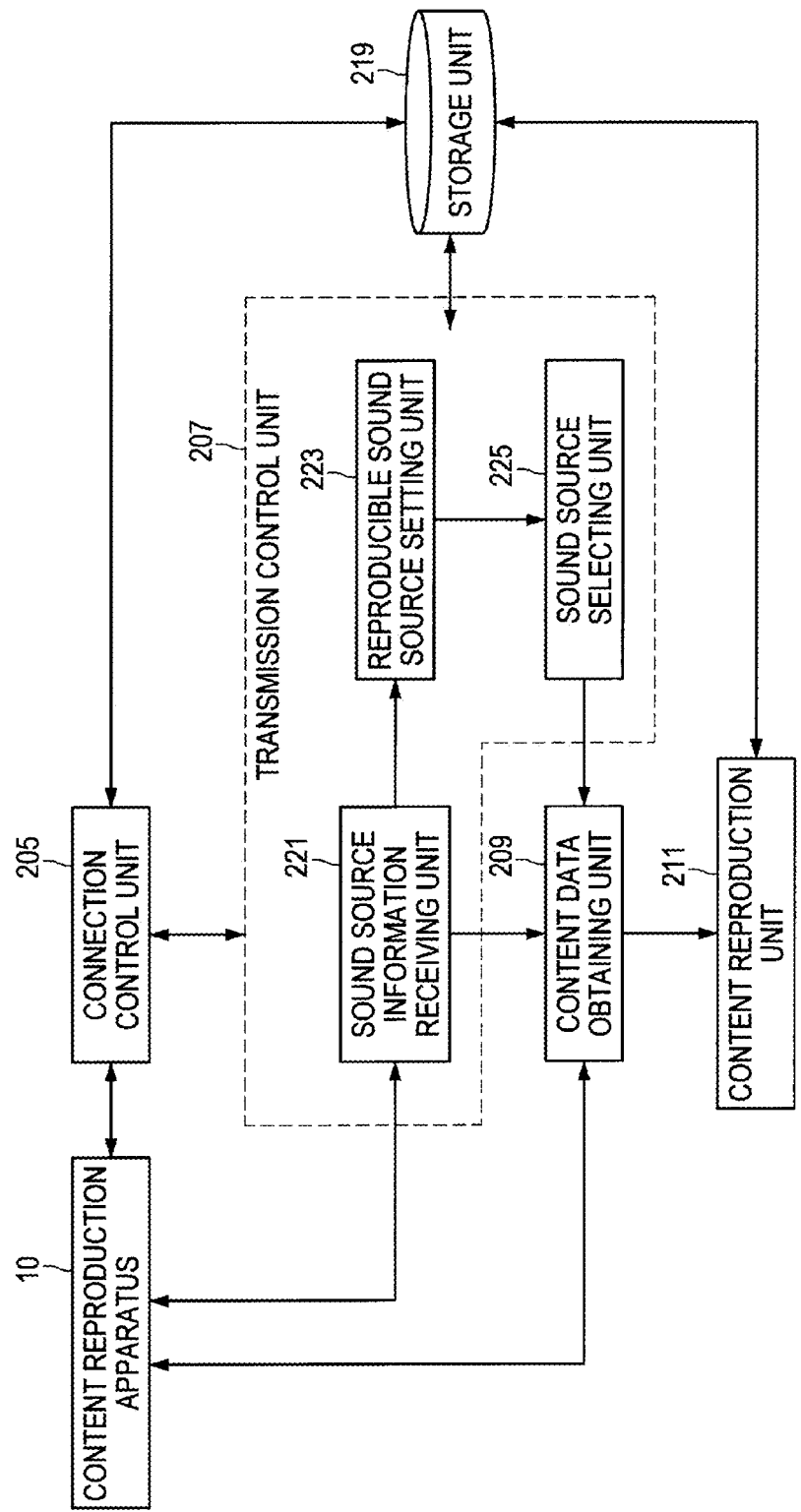
FIG. 14 is a block diagram showing a functional configuration of a transmission control unit of the content receiving apparatus according to the embodiment.

Now, a more detailed configuration of the transmission control unit 207 according to the present embodiment will be described with reference to FIG. 14. FIG. 14 is a block diagram showing a functional configuration of the transmission control unit 207 according to the present embodiment.

The transmission control unit 207 according to the present embodiment includes, as shown in FIG. 14, a sound source information receiving unit 221, a reproducible sound source setting unit 223, and a sound source selecting unit 225.

The sound source information receiving unit 221 includes, for example, a CPU, a ROM, a RAM, and a radio communication device. The sound source information receiving unit 221 receives from the content reproduction apparatus 10 sound source information including sound source type information indicating the sound source types of audio signals transmitted on each of a plurality of channels and external connection device reproduction sound source information indicating the sound source type of an audio signal being reproduced on the content reproduction apparatus 10 which is an external connection device. In receiving the sound source information, the sound source information receiving unit 221 may use various databases, etc., recorded in the storage unit 219.

The above-described sound source type information is information indicating the types of audio signals transmitted from the radio communication control unit 113 of the content reproduction apparatus 10 through a plurality of channels. The audio signals transmitted on the respective channels are respectively associated with sound sources of the content reproduction apparatus 10. The sound source type information is similar to channel mapping according to the above-described audio signal radio transmission technology. By referring to the sound source type information, the content receiving apparatus 20 can know the mode type (i.e., a type, either the surround mode or multi-source mode) of the content reproduction apparatus 10 which is a parent device and the types of sound sources transmitted on the respective channels.

The above-described external connection device reproduction sound source information is information that indicates the type of an audio signal being reproduced on the content reproduction apparatus 10 which is a parent device to which the content receiving apparatus 20 is connected, and that changes every time the sound source being reproduced on the content reproduction apparatus 10 as a parent device changes. By obtaining the external connection device reproduction sound source information, the content receiving apparatus 20 can grasp the type of a sound source being reproduced on the content reproduction apparatus 10.

The content reproduction apparatus 10 may transmit, as external connection device reproduction sound source information, information about a sound source being currently reproduced to the content receiving apparatus 20 every time the type of a sound source being reproduced on the content reproduction apparatus 10 changes, or may transmit, as external connection device reproduction sound source information, information about a sound source being currently reproduced to the content receiving apparatus 20 at every predetermined time interval. Alternatively, in response to a request to obtain external connection device reproduction sound source information which is transmitted from the sound source information receiving unit 221 of the content receiving apparatus 20, the content reproduction apparatus 10 may transmit, as external connection device reproduction sound source information, information about a sound source being currently reproduced to the content receiving apparatus 20.

The sound source information receiving unit 221 transmits the received sound source type information to the content data obtaining unit 209 which will be described later and transmits the received sound source type information and external connection device reproduction sound source information to the reproducible sound source setting unit 223 which will be described later. Further, the sound source information receiving unit 221 may record the received sound source information in the storage unit 219.

The reproducible sound source setting unit 223 includes, for example, a CPU, a ROM, a RAM, and a radio communication device. The reproducible sound source setting unit 223 sets sound sources reproducible on the content receiving apparatus 20, based on sound source type information transmitted from the sound source information receiving unit 221. Further, the reproducible sound source setting unit 223 sets, as an external connection device reproduction sound source, a sound source of an audio signal being reproduced on the content reproduction apparatus 10 which is an external connection device, to a reproducible sound source based on external connection device reproduction sound source information transmitted from the sound source information receiving unit 221. In the following description, an external connection device reproduction sound source is referred to as the "main unit function". A sound source reproducible on the content receiving apparatus 20 is referred to as the "subfunction".

More specifically, the reproducible sound source setting unit 223 according to the present embodiment not only sets, as reproducible sound sources, sound sources (i.e., functions such as TUNER such as DVD, CD, AM, and FM, XM, DMPORT, and AUDIO IN) associated with audio signals assigned to main channels, based on sound source type information transmitted from the sound source information receiving unit 221 but also newly adds a sound source called the main unit function to these reproducible sound sources.

The sound source selecting unit 225 selects a sound source to be reproduced on the content receiving apparatus 20 from reproducible sound sources set by the reproducible sound source setting unit 223. More specifically, when a user selects a reproducible sound source using an input device such as various operation keys and toggles provided to the content receiving apparatus 20, the sound source selecting unit 225 determines that a corresponding sound source is selected, and thus requests the content data obtaining unit 209 which will be described later, to obtain an audio signal associated with the sound source selected by the sound source selecting unit 225.

The content data obtaining unit 209 includes, for example, a CPU, a ROM, a RAM, and a radio communication device. The content data obtaining unit 209 obtains, based on sound source type information transmitted from the sound source information receiving unit 221, content data such as an audio signal associated with a sound source selected by the sound source selecting unit 225, from the content reproduction apparatus 10. More specifically, the content data obtaining unit 209 searches for a channel on which an audio signal associated with a sound source notified by the sound source selecting unit 225 is transmitted, based on CH mapping included in sound source type information received by the sound source information receiving unit 221. Then, the content data obtaining unit 209 obtains appropriate content data such as an audio signal from the content reproduction apparatus 10 according to the search result. The content data obtaining unit 209 outputs the obtained content data such as an audio signal to the content reproduction unit 211. The content data obtaining unit 209 may record the obtained content data such as an audio signal in the storage unit 219.

The content reproduction unit 211 includes, for example, a CPU, a ROM, a RAM, and a radio communication device. The content reproduction unit 211 reproduces content data such as an audio signal transmitted from the content reproduction apparatus 10 and obtained by the content data obtaining unit 209. In reproducing the content data such as an audio signal, the content reproduction unit 211 can perform adjustment of sound volume, running control of the audio signal, etc. Further, in reproducing the content data, the content reproduction unit 211 may refer to various databases recorded in the storage unit 219 which will be described later.

The display control unit 213 performs display control when various information transmitted from the connection control unit 205 and the transmission control unit 207 is displayed on the display unit 215 included in the content receiving apparatus 20. Examples of the information displayed on the display unit 215 by the connection control unit 205 and the transmission control unit 207 include information indicating a link state or a connection state between the content receiving apparatus 20 and the content reproduction apparatus 10 which is a parent device, information about the type and reproduction state of an audio signal included in content data received from the content reproduction apparatus 10, and broadcasting station information or track information being reproduced on the content receiving apparatus 20. The display control unit 213 may refer to various databases, etc., recorded in the storage unit 219 which will be described later, when performing display control of the display unit 215.

The display control unit 213 can also perform display control when displaying on the display unit 215 information that has become necessary for the content receiving apparatus 20 to display, in addition to the above-described information.

The processing instruction signal generating unit 217 generates a processing instruction signal for causing the content reproduction apparatus 10 to perform a predetermined processing, in a format that allows communication according to the communication standard B and transmits the generated processing instruction signal to the radio communication control unit 201. Such a processing instruction signal includes, for example, processing related to an operation of a running system such as reproduce, stop, fast forward, or rewind of content, a sound volume adjustment processing, etc., performed on the content reproduction apparatus 10.

In the storage unit 219 are stored, for example, a database in which the types of audio signals forming CH mapping information in the above-described audio signal radio transmission technology, etc., are recorded, various transmission information that can be transmitted to the content reproduction apparatus 10, and various programs and processing methods which are used by the content receiving apparatus 20 according to the present embodiment.

Furthermore, in the storage unit 219, in addition to the above-described database and programs, various parameters, midway progress of a processing, etc., which have become necessary to save when the content receiving apparatus 20 performs some processing, can be appropriately stored. Processing units that constitute the content receiving apparatus 20, such as the radio communication control unit 201, the operation unit 203, the connection control unit 205, the transmission control unit 207, the content data obtaining unit 209, the content reproduction unit 211, the display control unit 213, the display unit 215, and the processing instruction signal generating unit 217 can freely perform a read and a write on the storage unit 219.

An example of the functions of the content receiving apparatus 20 according to the present embodiment is shown above. Each of the above-described components may be configured using a generic member or circuit or may be configured by hardware dedicated for the function of each component. Alternatively, all the functions of the components may be performed by a CPU, etc. Thus, a configuration to be used can be appropriately changed according to the technical level available at the time when the present embodiment is performed.

[Configuration of the Reproduction Control Apparatus 30]

Figure 15:
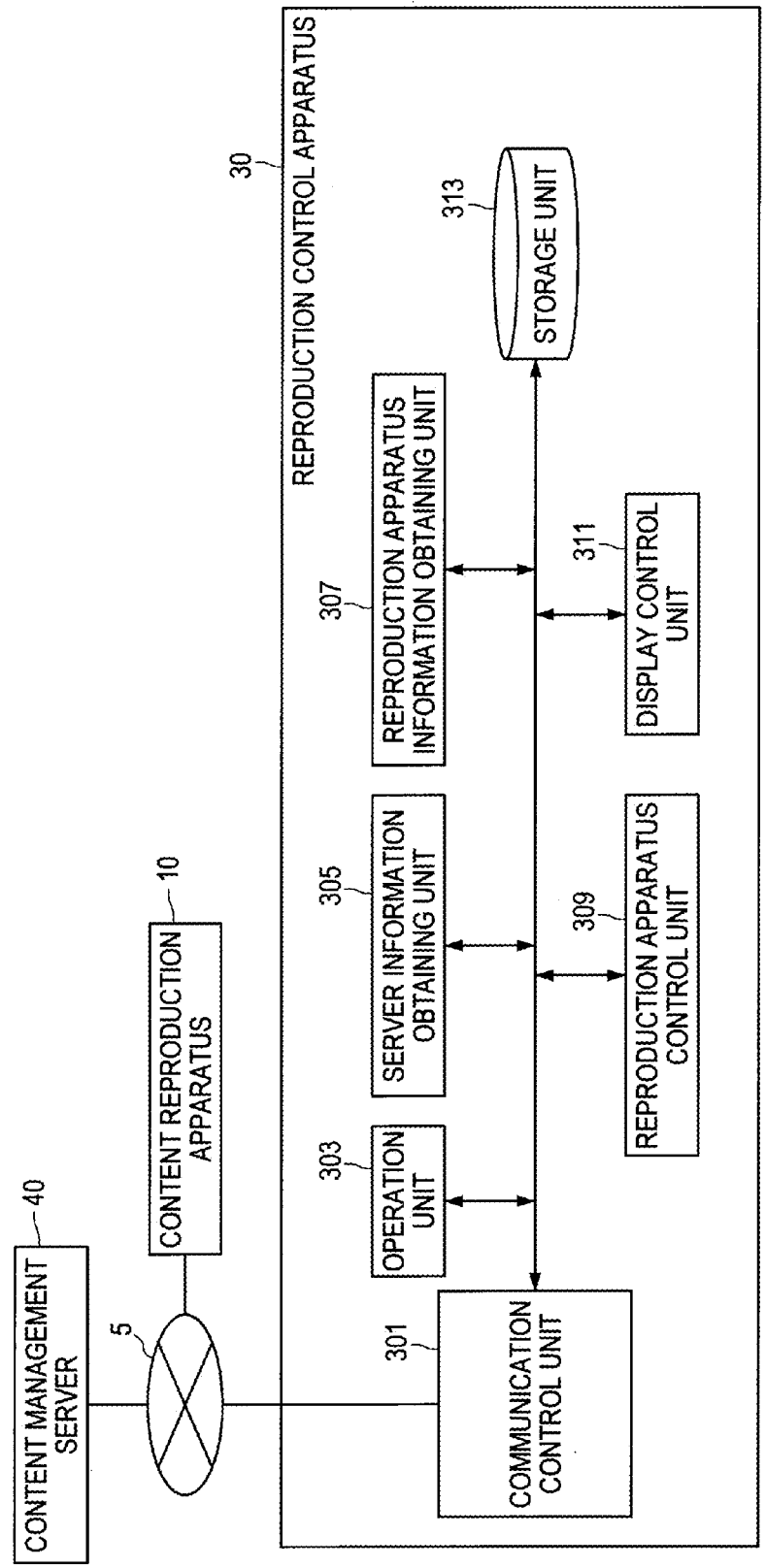
FIG. 15 is a block diagram showing a functional configuration of a reproduction control apparatus according to the embodiment.

Next, a configuration of a reproduction control apparatus according to the present embodiment will be described in detail with reference to FIG. 15. FIG. 15 is a block diagram showing a functional configuration of a reproduction control apparatus according to the present embodiment.

As shown in FIG. 15, a reproduction control apparatus 30 according to the present embodiment mainly includes a communication control unit 301, an operation unit 303, a server information obtaining unit 305, a reproduction apparatus information obtaining unit 307, a reproduction apparatus control unit 309, a display control unit 311, and a storage unit 313.

The communication control unit 301 includes, for example, a CPU, a ROM, a RAM, and a communication device. The communication control unit 301 performs communication control of various data to be transmitted and received between the reproduction control apparatus 30 and a content reproduction apparatus 10 and between the reproduction control apparatus 30 and a content management server 40.

More specifically, the communication control unit 301 transmits various data or signals to the content reproduction apparatus 10 or the content management server 40, in response to a request from any of processing units included in the reproduction control apparatus 30 according to the present embodiment. Further, the communication control unit 301 receives various data or signals transmitted from the content reproduction apparatus 10 or the content management server 40 and transmits the received data or signals to an appropriate processing unit included in the reproduction control apparatus 30 according to the present embodiment.

Further, the communication control unit 301 can use the storage unit 313 which will be described later, as a transmission and reception buffer.

The operation unit 303 includes, for example, a CPU, a ROM, a RAM, and an input device. The operation unit 303 converts an operation performed on various input switches such as a content selection switch, a reproduction switch, and a stop switch which are provided to the reproduction control apparatus 30, into a predetermined signal and transmits the signal to an appropriate processing unit. Operations performed on the input switches such as those described above include, for example, an operation for obtaining content attribute information from the content management server 40 and an operation for causing a specific content reproduction apparatus 10 to reproduce or stop specific content.

The server information obtaining unit 305 includes, for example, a CPU, a ROM, and a RAM. The server information obtaining unit 305 obtains from the content management server 40 to which the reproduction control apparatus 30 is connected over a communication network 5, server information about the content management server 40.

More specifically, the server information obtaining unit 305 broadcasts, using a protocol such as SSDP, a server discovery protocol onto the communication network 5 and obtains server identification information from a content management server 40 from which a response has been received. The server identification information includes identification information, e.g., an IP address provided to the content management server 40, the manufacturer name and device model name of the content management server 40, a UUID (Universally Unique IDentifier) provided to the content management server 40, etc.

Further, the server information obtaining unit 305 transmits, using a protocol such as SOAP, a request to obtain a list of content folders managed by the content management server 40 to the content management server 40 and thereby obtains a list of content folders managed by the content management server 40. Furthermore, the server information obtaining unit 305 transmits a request to obtain a list of content managed by the content management server 40 to the content management server 40 and thereby obtains a list of content managed by the content management server 40. Such information about content folders and information about content itself include attribute information, location information, etc., of the folders and the content.

Server information including server identification information, attribute information about content managed by a server, etc., which is obtained by the server information obtaining unit 305 is, for example, recorded in a server information recording area of the storage unit 313 which will be described later, in association with information about time at which the server information is obtained, etc. The server information can be freely referred to by the processing units included in the reproduction control apparatus 30 according to the present embodiment.

Further, the server information obtaining unit 305 can generate, based on obtained server identification information, attribute information about content, etc., a server list which is a list of servers to which the reproduction control apparatus 30 can be connected, a content folder list which is a list of content folders to which the reproduction control apparatus 30 can be connected, a content list which is a list of content obtainable by the reproduction control apparatus 30, etc.

The server information obtaining unit 305 can transmit these generated lists to the display control unit 311 which will be described later, to cause a display unit (not shown) of the reproduction control apparatus 30 to display the lists. The server information obtaining unit 305 may record these generated lists in the storage unit 313 which will be described later.

When performing such processing, the server information obtaining unit 305 may refer to various parameters or databases recorded in the storage unit 313 which will be described later, etc., or may execute various programs recorded in the storage unit 313 which will be described later, etc.

The reproduction apparatus information obtaining unit 307 includes, for example, a CPU, a ROM, and a RAM. The reproduction apparatus information obtaining unit 307 obtains from the content reproduction apparatus 10 to which the reproduction control apparatus 30 is connected over the communication network 5, reproduction apparatus information about the content reproduction apparatus 10.

More specifically, the reproduction apparatus information obtaining unit 307 broadcasts, using a protocol such as SSDP, a content reproduction apparatus discovery protocol onto the communication network 5 and obtains reproduction apparatus identification information from a content reproduction apparatus 10 from which a response has been received. The reproduction apparatus identification information includes identification information, e.g., an IP address provided to the content reproduction apparatus 10, the manufacturer name and device model name of the content reproduction apparatus 10, etc., and may further include, as information, a UUID (Universally Unique IDentifier) provided to the content reproduction apparatus 10, etc.

The reproduction apparatus information obtaining unit 307 can also obtain from the content reproduction apparatus 10 information about the types of content reproducible on the content reproduction apparatus 10, etc.

Reproduction apparatus information including reproduction apparatus identification information, etc., which is obtained by the reproduction apparatus information obtaining unit 307 is, for example, recorded in a reproduction apparatus information recording area of the storage unit 313 which will be described later, in association with information about time at which the reproduction apparatus information is obtained, etc. The reproduction apparatus information can be freely referred to by the processing units included in the reproduction control apparatus 30 according to the present embodiment.

Further, the reproduction apparatus information obtaining unit 307 can generate, based on obtained reproduction apparatus identification information, etc., a reproduction apparatus list which is a list of content reproduction apparatuses 10 to which the reproduction control apparatus 30 can be connected, etc.

The reproduction apparatus information obtaining unit 307 can transmit the generated list to the display control unit 311 which will be described later, to cause a display unit (not shown) of the reproduction control apparatus 30 to display the list. The reproduction apparatus information obtaining unit 307 may record the generated list in the storage unit 313 which will be described later.

When performing such processing, the reproduction apparatus information obtaining unit 307 may refer to various parameters or databases recorded in the storage unit 313 which will be described later, etc., or may execute various programs recorded in the storage unit 313 which will be described later, etc.

The reproduction apparatus control unit 309 includes, for example, a CPU, a ROM, and a RAM. The reproduction apparatus control unit 309 performs control to cause a content reproduction apparatus 10 selected by a user operation performed on the reproduction control apparatus 30 to reproduce content selected by a user operation.

More specifically, when a content reproduction apparatus 10 on which content is to be reproduced and content to be reproduced on the content reproduction apparatus 10 are determined, the reproduction apparatus control unit 309 transmits reproduction content attribute information about the content that is determined to be reproduced. The reproduction content attribute information includes, for example, attribute information such as identification information about a server that manages content to be reproduced, a title, content size, content length, and a URL to access the content. The reproduction apparatus control unit 309 generates reproduction content attribute information such as that described above, based on server information recorded in the storage unit 313 which will be described later, and transmits the generated reproduction content attribute information based on reproduction apparatus information recorded in the storage unit 313 which will be described later. The reproduction apparatus control unit 309 may record the generated reproduction content attribute information in the storage unit 313 which will be described later.

When the reproduction apparatus control unit 309 receives from the content reproduction apparatus 10 to which reproduction content attribute information has been transmitted, a notification indicating that the attribute information has been received, the reproduction apparatus control unit 309 transmits a content reproduction request to the content reproduction apparatus 10. The reproduction apparatus control unit 309 can also transmit a content reproduction stop request (i.e., a content stop request) to the content reproduction apparatus 10 that is reproducing content.

When performing such processing, the reproduction apparatus control unit 309 may refer to various parameters or databases recorded in the storage unit 313 which will be described later, etc., or may execute various programs recorded in the storage unit 313 which will be described later, etc.

The display control unit 311 includes, for example, a CPU, a ROM, and a RAM. The display control unit 311 performs display control when the processing units included in the reproduction control apparatus 30 according to the present embodiment display various data, information, etc., on a display unit (not shown). When performing such processing, the display control unit 311 may refer to various parameters or databases recorded in the storage unit 313 which will be described later, etc., or may execute various programs recorded in the storage unit 313 which will be described later, etc.

In the storage unit 313, various parameters, midway progress of a processing, etc., which have become necessary to save when the reproduction control apparatus 30 according to the present embodiment performs some processing, various databases, or the like, are appropriately recorded. The communication control unit 301, the operation unit 303, the server information obtaining unit 305, the reproduction apparatus information obtaining unit 307, the reproduction apparatus control unit 309, the display control unit 311, etc., can freely perform a read and a write on the storage unit 313.

An example of the functions of the reproduction control apparatus 30 according to the present embodiment is shown above. Each of the above-described components may be configured using a generic member or circuit or may be configured by hardware dedicated for the function of each component. Alternatively, all the functions of the components may be performed by a CPU, etc. Thus, a configuration to be used can be appropriately changed according to the technical level available at the time when the present embodiment is performed.

[Configuration of the Content Management Server 40]

Figure 16:
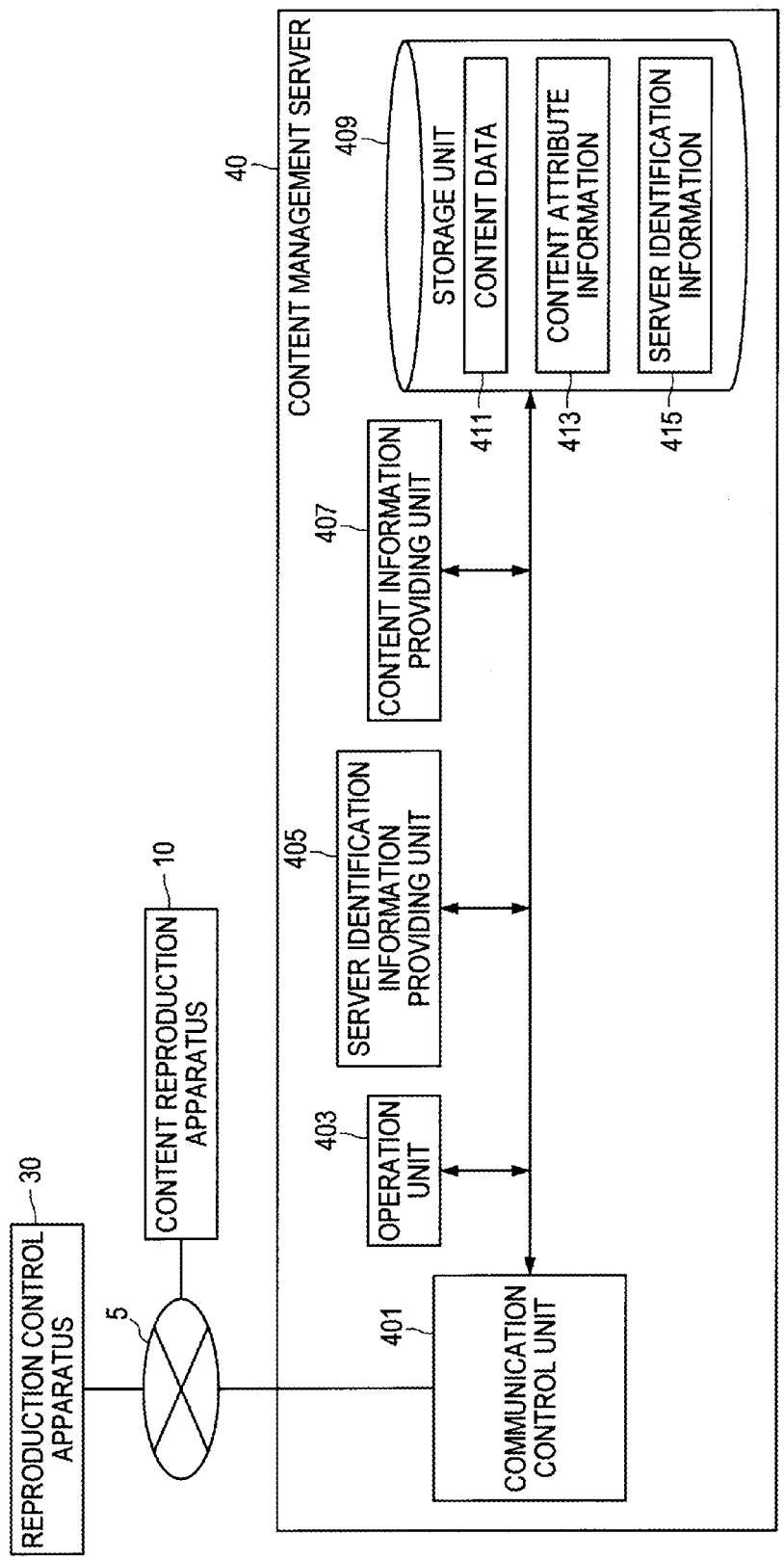
FIG. 16 is a block diagram showing a functional configuration of a content management server according to the embodiment.

Next, a configuration of a content management server according to the present embodiment will be described in detail with reference to FIG. 16. FIG. 16 is a block diagram showing a functional configuration of a content management server according to the present embodiment.

As shown in FIG. 16, a content management server 40 according to the present embodiment mainly includes a communication control unit 401, an operation unit 403, a server identification information providing unit 405, a content information providing unit 407, and a storage unit 409.

The communication control unit 401 includes, for example, a CPU, a ROM, a RAM, and a communication device. The communication control unit 401 performs communication control of various data to be transmitted and received between the content management server 40 and a content reproduction apparatus 10 and between the content management server 40 and a reproduction control apparatus 30.

More specifically, the communication control unit 401 transmits various data or signals to the content reproduction apparatus 10 or the reproduction control apparatus 30, in response to a request from any of processing units included in the content management server 40 according to the present embodiment. Further, the communication control unit 401 receives various data or signals transmitted from the content reproduction apparatus 10 or the reproduction control apparatus 30 and transmits the received data or signals to an appropriate processing unit included in the content management server 40 according to the present embodiment.

Further, the communication control unit 401 can use the storage unit 409 which will be described later, as a transmission and reception buffer.

The operation unit 403 includes, for example, a CPU, a ROM, a RAM, and an input device. The operation unit 403 converts an operation performed on various input switches such as a content selection switch, a reproduction switch, and a stop switch which are provided to the content management server 40, into a predetermined signal and transmits the signal to an appropriate processing unit.

The server identification information providing unit 405 includes, for example, a CPU, a ROM, and a RAM. The server identification information providing unit 405 transmits server identification information for identifying the content management server 40, to the reproduction control apparatus 30. The server identification information is specific information for the content management server 40 and includes identification information, e.g., an IP address provided to the content management server 40, the manufacturer name and device model name of the content management server 40, a UUID provided to the content management server 40, etc. More specifically, the server identification information providing unit 405 transmits server identification information 415 obtained from the storage unit 409 which will be described later, to the reproduction control apparatus 30 as a response to a server discovery protocol which is broadcast by the reproduction control apparatus 30 over a communication network 5.

The content information providing unit 407 includes, for example, a CPU, a ROM, and a RAM. The content information providing unit 407 provides attribute information about content folders managed by the content management server 40, attribute information about content managed by the content management server 40, etc., to the reproduction control apparatus 30, in response to various information obtainment requests transmitted from the reproduction control apparatus 30. Further, the content information providing unit 407 provides content data corresponding to content managed by the content management server 40, to the content reproduction apparatus 10 in response to a content data obtainment request transmitted from the content reproduction apparatus 10.

More specifically, in response to a request to obtain a list of content folders or a request to obtain a list of content which is broadcast from the reproduction control apparatus 30, the content information providing unit 407 provides requested information to the reproduction control apparatus 30 by referring to content attribute information 413 stored in the storage unit 409 which will be described later.

Further, in response to a request to obtain content data corresponding to a specific piece of content which is transmitted from the content reproduction apparatus 10, the content information providing unit 407 obtains content data 411 specified by the content reproduction apparatus 10 from the storage unit 409 and provides the content data 411 to the content reproduction apparatus 10.

In the storage unit 409 are stored content data 411 about content managed by the content management server 40 and content attribute information 413. The content data 411 may be, for example, stored in the storage unit 409 as a playlist which is a set of a plurality of pieces of content selected by a user. Further, in the storage unit 409 is stored server identification information 415 for identifying the content management server 40.

Further, in the storage unit 409, various parameters, midway progress of processing, etc., that have become necessary to save when the content management server 40 according to the present embodiment performs some processing, various databases, or the like, may be appropriately recorded. The communication control unit 401, the operation unit 403, the server identification information providing unit 405, the content information providing unit 407, etc., can freely perform a read and a write on the storage unit 409.

An example of the functions of the content management server 40 according to the present embodiment is shown above. Each of the above-described components may be configured using a generic member or circuit or may be configured by hardware dedicated for the function of each component. Alternatively, all the functions of the components may be performed by a CPU, etc. Thus, a configuration to be used can be appropriately changed according to the technical level available at the time when the present embodiment is performed.

[Regarding Hardware Configuration]

Figure 17:
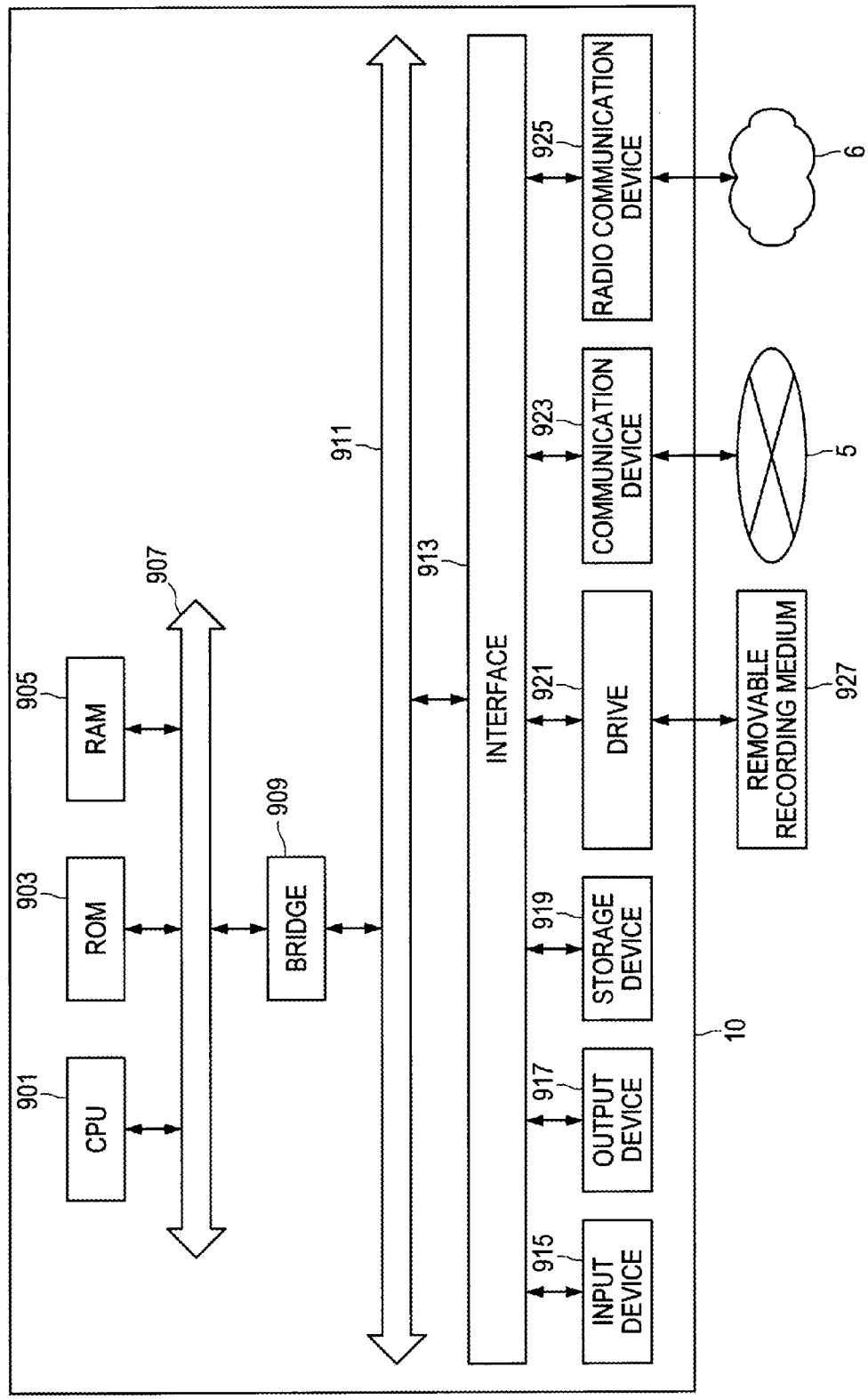
FIG. 17 is a block diagram showing a hardware configuration of the content reproduction apparatus according to the embodiment.

Next, with reference to FIG. 17, a hardware configuration for implementing the functions of a content reproduction apparatus 10 according to the embodiment of the present invention having a configuration such as that described above will be described in detail. FIG. 17 is a block diagram showing a hardware configuration of the content reproduction apparatus 10 according to the embodiment of the present invention.

The content reproduction apparatus 10 mainly includes a CPU 901, a ROM 903, a RAM 905, a host bus 907, a bridge 909, an external bus 911, an interface 913, an input device 915, an output device 917, a storage device 919, a drive 921, a communication device 923, and a radio communication device 925.

The CPU 901 functions as an arithmetic processing device and a control device and controls all or some of the operations performed in the content reproduction apparatus 10, according to various programs recorded in the ROM 903, the RAM 905, the storage device 919, or a removable recording medium 927. The ROM 903 stores programs, computation parameters, etc., which are used by the CPU 901. The RAM 905 temporarily stores a program used in execution of the CPU 901, parameters that appropriately change in the execution, etc. These components are interconnected via the host bus 907 which is constituted by an internal bus such as a CPU bus.

The host bus 907 is connected, via the bridge 909, to the external bus 911 such as a PCI (Peripheral Component Interconnect/Interface) bus.

The input device 915 is an operation means operated by a user, e.g., a mouse, a keyboard, a touch panel, a button, a switch, a lever, etc. The input device 915 may be, for example, a remote control means (so-called remote control) that uses infrared rays or other radio waves, or be an external connection device (not shown) such as a mobile phone or a PDA that supports an operation on the content reproduction apparatus 10. Furthermore, the input device 915 includes, for example, an input control circuit that generates an input signal based on information input by the user using the above-described operation means and outputs the signal to the CPU 901. The user of the content reproduction apparatus 10 can input various data to the content reproduction apparatus 10 or instruct the content reproduction apparatus 10 to perform a processing operation, by operating the input device 915.

The output device 917 is constituted by a device that can visually or acoustically provide notification of obtained information to a user, e.g., a display device such as a CRT display device, a liquid crystal display device, a plasma display device, an EL display device, or a lamp, an audio output device such as a speaker or headphones, a printer device, a mobile phone, or a facsimile. The output device 917, for example, outputs the results obtained by various processing performed by the content reproduction apparatus 10. Specifically, the display apparatus displays results obtained by various processing performed by the content reproduction apparatus 10, in the form of text or image. On the other hand, the audio output device converts an audio signal including reproduced audio data or acoustic data into an analog signal and outputs the analog signal.

The storage device 919 is a data storage device which is configured as an example of a storage unit of the content reproduction apparatus 10, and is constituted by, for example, a magnetic storage device such as an HDD (Hard Disk Drive), a semiconductor storage device, an optical storage device, or a magneto-optical storage device. The storage device 919 stores programs to be executed by the CPU 901, various data, acoustic signal data and image signal data which are obtained from an external source, etc.

The drive 921 is a recording medium reader/writer and is integrated in the content reproduction apparatus 10 or provided external to the content reproduction apparatus 10. The drive 921 reads information recorded in the removable recording medium 927 attached to the drive 921, such as a magnetic disk, an optical disk, a magneto-optical disk, or a semiconductor memory, and outputs the information to the RAM 905. The drive 921 can also write records to the removable recording medium 927 placed in the drive 921, such as a magnetic disk, an optical disk, a magneto-optical disk, or a semiconductor memory. The removable recording medium 927 is, for example, a DVD medium, an HD-DVD medium, a Blu-ray medium, a CompactFlash (CF) (registered trademark), a memory stick, or an SD (Secure Digital) memory card. Alternatively, the removable recording medium 927 may be, for example, an IC (Integrated Circuit) card having mounted thereon a contactless IC chip or an electronic device.

The communication device 923 is a communication interface constituted by, for example, a communication device for connecting to a communication network 5. The communication device 923 is, for example, a communication card for a wired or wireless LAN (Local Area Network), Bluetooth, or WUSB (Wireless USB), a router for optical communications, a router for ADSL (Asymmetric Digital Subscriber Line), or a modem for various communications. The communication device 923 can perform, for example, transmission and reception of signals, etc., conforming to a predetermined protocol, e.g., TCP/IP, on the Internet or with other communication devices. The communication network 5 connected to the communication device 923 is constituted by a network connected by wire or wirelessly, etc., and may be, for example, the Internet, an in-home LAN, infrared ray communication, radio wave communication, or satellite communication.

The radio communication device 925 is a communication interface constituted by, for example, a communication device for connecting to a radio communication network 6. The radio communication device 925 is, for example, an apparatus for performing radio communication with a frequency band of radio waves, etc., which is not compatible with the communication device 923. Specifically, the radio communication device 925 is, for example, a communication device conforming to a communication standard which is used in the above-described audio signal radio transmission technology. Namely, the radio communication device 925 is, for example, a communication device conforming to a communication standard that realizes data transmission by radio communication with a 2.4 GHz-band using a plurality of channels which are paths for transmitting data including audio signals.

Note that the content reproduction apparatus 10 may include, though not shown, a connecting port. The connecting port is a port for directly connecting a device to the content reproduction apparatus 10, e.g., a USB (Universal Serial Bus) port, an IEEE 1394 port, such as i.Link, an SCSI (Small Computer System Interface) port, an RS-232C port, an optical audio terminal, or an HDMI (High-Definition Multimedia Interface) port. By connecting an external connection device to the connecting port, the content reproduction apparatus 10 directly obtains acoustic signal data or image signal data from the external connection device or provides acoustic signal data or image signal data to the external connection device.

An example of the hardware configuration that can implement the functions of the content reproduction apparatus 10 according to the embodiment of the present invention is shown above. Each of the above-described components may be configured using a generic member or may be configured by hardware dedicated for the function of each component. Thus, a hardware configuration to be used can be appropriately changed according to the technical level available at the time when the present embodiment is performed.

The functions of the content receiving apparatus 20 according to the embodiment of the present invention can also be implemented using the example of the hardware configuration shown in FIG. 17. Note, however, that the content receiving apparatus 20 only needs to be connectable to at least the content reproduction apparatus 10 over the radio communication network 6 and thus does not necessarily need to include a communication device 923.

The content reproduction apparatus 10 according to the embodiment of the present invention can also be provided in the form of a program having functions such as those shown below. Specifically, the program is for causing a computer to implement: a reproduction request receiving function of receiving, from a first external device which conforms to a first communication standard, a request to obtain and reproduction content data selected by the first external device; a content data obtaining function of obtaining, from a second external device which conforms to the first communication standard and stores the content data selected by the first external device, the content data in response to the request received by the reproduction request receiving function; a reproducing function of reproducing the content data obtained by the content data obtaining function; and a data converting function of converting data which can be transmitted according to the first communication standard into data which can be transmitted according to a second communication standard which is different than the first communication standard.

According to such a configuration, the computer program is stored in a storage unit included in a computer and is loaded into a CPU included in the computer and then executed, whereby the computer is caused to function as the above-described content reproduction apparatus. Further, a computer-readable recording medium in which the computer program is recorded can be provided. The recording medium is, for example, a magnetic disk, an optical disk, a magneto-optical disk, or a flash memory. The above computer program may be distributed, for example, over a network without using a recording medium.

The content receiving apparatus 20 according to the embodiment of the present invention can also be provided in the form of a program having functions such as those shown below. Specifically, the program is for causing a computer to implement: a content data obtaining function of obtaining, when content data being reproduced on a second external device based on control by a first external device conforming to a first communication standard is converted by the second external device into data which can be transmitted according to a second communication standard which is different than the first communication standard, the converted content data; and a reproducing function of reproducing the content data obtained by the content data obtaining function.

According to such a configuration, the computer program is stored in a storage unit included in a computer and is loaded into a CPU included in the computer and then executed, whereby the computer is caused to function as the above-described content receiving apparatus. Further, a computer-readable recording medium in which the computer program is recorded can be provided. The recording medium is, for example, a magnetic disk, an optical disk, a magneto-optical disk, or a flash memory. The computer program may be distributed, for example, over a network without using a recording medium.

The configurations of the content reproduction system 10 and apparatuses that constitute the system 10, according to the embodiment of the present invention are described in detail above.

[Regarding Method of Reproducing Content in the Content Reproduction System 1]

Next, with reference to FIGS. 18 to 20, a method of reproducing content in the content reproduction system 1 according to the embodiment of the present invention will be described using, as an example, three use cases. FIG. 18 is an explanatory diagram for illustrating a first use case of the content reproduction system 1. FIG. 19 is an explanatory diagram for illustrating a second use case of the content reproduction system 1. FIG. 20 is an explanatory diagram for illustrating a third use case of the content reproduction system 1.

First, a method of reproduction content in the first use case of the content reproduction system 1 will be described with reference to FIG. 18. The first use case is an example case in which a single content receiving apparatus 20 is caused to reproduce an audio signal of a single sound source being reproduced on a content reproduction apparatus 10.

(Method of Reproducing on the Content Receiving Apparatus 20)

As shown in FIG. 18, in the method of reproducing content in the first use case according to the present embodiment, first, a reproduction control apparatus 30 obtains content information managed by a hierarchical structure such as CDS by a content management server 40 (S101). Then, the reproduction control apparatus 30 creates a list of content managed by the content management server 40, based on the obtained content information.

Then, the reproduction control apparatus 30 selects a specific piece of content from the created list of content and determines a content reproduction apparatus 10 that is to reproduce the specific piece of content. The reproduction control apparatus 30 then transmits a request to obtain and reproduce the selected specific piece of content to the determined content reproduction apparatus 10 (S103).

A content data obtaining unit 107 of the content reproduction apparatus 10 having received the request requests the content management server 40 to obtain content data specified by the reproduction control apparatus 30 (S105). In response to this, the content management server 40 transmits requested content data to the content reproduction apparatus 10 as a response to the content data obtainment request from the content data obtaining unit 107. Then, the content data obtaining unit 107 obtains from the content management server 40 the content data specified by the reproduction control apparatus 30 (S107).

The content data obtaining unit 107 transmits the obtained content data to a content reproduction unit 109 and the content reproduction unit 109 reproduces the content data (S109).

Subsequently, the content data obtaining unit 107 transmits the content data being reproduced on the content reproduction apparatus 10 to a radio communication control unit 113 (S111). The transmission of the content data from the content data obtaining unit 107 to the radio communication control unit 113 may be directly performed as described above or may be performed through a data converting unit 111. Note, however, that even in the later case the content data itself may not be converted by the data converting unit 111 into data which can be transmitted over a radio communication network 6 (data which can be transmitted according to the communication standard B). Furthermore, reproduction control information for performing reproduction control of the content data may be transmitted from the content data obtaining unit 107 to the data converting unit 111. In this case, the reproduction control information is converted by the data converting unit 111 into data which can be transmitted over the radio communication network 6 (data which can be transmitted according to the communication standard B) and the data is transmitted to the radio communication control unit 113.

Then, the radio communication control unit 113 transmits the content data (e.g., an audio signal) transmitted from the content data obtaining unit 107, to a content receiving apparatus 20 over the radio communication network 6 (by communication according to the communication standard B) (S113). The content receiving apparatus 20 having received the content data transmitted from the radio communication control unit 113 reproduces the received content data (S115).

In this manner, the content receiving apparatus 20 can receive, through the content reproduction apparatus 10, content data stored in the content management server 40 with which the content receiving apparatus 20 may not perform direct communication due to different communication standards, and reproduce the content data.

(Method of Controlling the Content Reproduction Apparatus 10 by the Content Receiving Apparatus 20)

Further, in the first use case according to the present embodiment, the content receiving apparatus 20 can control the content reproduction apparatus 10 having functionality as a DLNA DMR which has the communication standard A different than the communication standard B to which the content receiving apparatus 20 conforms. This control method will be described below.

First, the content receiving apparatus 20 generates, for example, a processing instruction signal for causing the content reproduction apparatus 10 to perform a predetermined processing, in a format that allows communication according to the communication standard B and transmits the generated processing instruction signal to the radio communication control unit 113 (S201). Such a processing instruction signal includes, for example, processing related to an operation of a running system such as reproduce, stop, fast forward, or rewind of content, a sound volume adjustment processing, etc., performed on the content reproduction apparatus 10. The processing instruction signal is generated, for example, according to an operation (e.g., pressing a reproduction button) performed on an operation unit 203 of the content receiving apparatus 20.

Then, the radio communication control unit 113 transmits the processing instruction signal received as data which can be transmitted according to the communication standard B, to the data converting unit 111 (S203). The data converting unit 111 converts the processing instruction signal transmitted from the radio communication control unit 113 into data which can be transmitted according to the communication standard A, i.e., data interpretable by the content reproduction unit 109, and transmits the converted processing instruction signal to the content reproduction unit 109 (S205). The content reproduction unit 109 performs a predetermined processing (e.g., a content reproduction processing) based on the received processing instruction signal.

In this manner, the content receiving apparatus 20 can control the operation of the content reproduction apparatus 10 having functionality as a DLNA DMR which has the communication standard A different than the communication standard B to which the content receiving apparatus 20 conforms.

The processing instruction signal may be, for example, a signal indicating a request to obtain and reproduce content different than content being reproduced on the content reproduction apparatus 10. In this case, the data converting unit 111 can transmit a converted processing instruction signal to the content data obtaining unit 107. The content data obtaining unit 107 to which the processing instruction signal has been transmitted obtains content data specified by the content receiving apparatus 20 from the content management server 40.

Furthermore, the content management server 40 can automatically provide a predetermined playlist to the content reproduction apparatus 10 every certain time period. In this case, the content receiving apparatus 20 can generate a signal instructing to provide a playlist as a processing instruction signal and transmit the signal to the content reproduction apparatus 10. The content reproduction apparatus 10 having received such a signal is automatically provided with a predetermined playlist from the content management server 40, according to time at which the processing instruction signal is received from the content receiving apparatus 20.

(Method of Controlling the Content Receiving Apparatus 20 by the Reproduction Control Apparatus 30)

Further, in the first use case according to the present embodiment, the reproduction control apparatus 30 can control the content receiving apparatus 20 having functionality as a child device in the audio signal radio transmission technology which has the communication standard B different than the communication standard A to which the reproduction control apparatus 30 conforms. This control method will be described below.

First, the reproduction control apparatus 30 transmits, for example, a predetermined control signal such as a sound volume adjustment signal for adjusting the reproduction sound volume of content being reproduced on the content receiving apparatus 20, to the content reproduction apparatus 10 as data which can be transmitted according to the communication standard A (S301).

The content reproduction apparatus 10 having received the predetermined control signal converts, by the data converting unit 111, the received control signal into data which can be transmitted according to the communication standard B and transmits the converted control signal to the radio communication control unit 113 (S303).

Then, the radio communication control unit 113 transmits the control signal converted into data which can be transmitted according to the communication standard B, to the content receiving apparatus 20 over the radio communication network 6 (S113). Furthermore, the content receiving apparatus 20 performs a predetermined processing (e.g., processing of adjusting the reproduction sound volume of content being reproduced) based on the received control signal.

Next, a method of reproducing content in the second use case of the content reproduction system 1 will be described with reference to FIG. 19. The second use case is an example case in which a plurality of content receiving apparatuses 20 are caused to reproduce an audio signal of a single sound source being reproduced on a content reproduction apparatus 10. Note that here only procedures different from those in the above-described first use case will be described. Note also that in FIG. 19, in terms of the convenience of description, communication of a control signal is indicated by a solid-line arrow and a stream of audio signals is indicated by a dashed-line arrow.

In the second use case, a plurality of content receiving apparatuses 20 are connected to one combination of a data converting unit 111 and a radio communication control unit 113. In this case, content data at a single source being reproduced on the content reproduction apparatus 10 is simultaneously reproduced on all the content receiving apparatuses 20 connected to the content reproduction apparatus 10.

Further, in the second use case, each of the plurality of content receiving apparatuses 20 connected to the content reproduction apparatus 10 can transmit a control signal such as a processing instruction signal to the content reproduction apparatus 10. In this case, the control signals from the respective content receiving apparatuses 20 are input in turn to (a transmission control unit of) the content reproduction apparatus 10, and ultimately a control signal (command) from the content receiving apparatuses 20 which has input its control signal at the very end becomes effective.

Finally, a method of reproducing content in the third use case of the content reproduction system 1 will be described with reference to FIG. 20. The third use case is an example case in which a plurality of content receiving apparatuses 20 are caused to reproduce audio signals of a plurality of sound sources being played on a content reproduction apparatus 10. Note that here only procedures different from those in the above-described first and second use cases will be described. Note also that in FIG. 20, in terms of the convenience of description, communication of a control signal is indicated by a solid-line arrow and a stream of audio signals is indicated by a dashed-line arrow.

In the third use case, a plurality of content receiving apparatuses 20 are connected in a one-to-one correspondence to a plurality of combinations of a data converting unit 111 and a radio communication control unit 113. In this case, content data units at a plurality of sources being reproduced on the content reproduction apparatus 10 are independently reproduced on the plurality of content receiving apparatuses 20 connected to the content reproduction apparatus 10.

As in the second use case, also in the third use case, each of the plurality of content receiving apparatuses 20 connected to the content reproduction apparatus 10 can transmit a control signal such as a processing instruction signal to the content reproduction apparatus 10. Note, however, that in this case in (the transmission control unit of) the content reproduction apparatus 10 the control signals from the respective content receiving apparatuses 20 are received by their respective corresponding combinations of a data converting unit 111 and a radio communication control unit 113 to which the content receiving apparatuses 20 are respectively connected. Therefore, the control signals from the respective content receiving apparatuses 20 maintain independence and (the transmission control unit of) the content reproduction apparatus 10 performs processing corresponding to the respective control signals, for each of the content receiving apparatuses 20 having transmitted the control signals.

<4. Summary>

According to the embodiment of the present invention described above, data communication between devices having different communication standards is realized and thus mutual control between the devices having different communication standards is realized. Therefore, devices complying with communication standards which are not compatible with each other, e.g., DLNA and the audio signal radio transmission technology, can be indirectly connected to each other through a content reproduction apparatus 10, whereby the advantages of the respective standards can be made use of. That is, according to the embodiment, while the advantages of DLNA are made use of, the setting of the connection between devices and selection of content can be facilitated.

For example, a child device in the audio signal radio transmission technology can view content in a DMS in DLNA and furthermore the child device in the audio signal radio transmission technology can perform a reproduction operation such as start reproducing, stop, or skip forward, without through a DMC and thus control between different standards, i.e., DLNA and the audio signal radio transmission technology, is realized.

As described above, the embodiment of the present invention realizes the following.

(1) Content in a DMS in DLNA can be viewed by a device complying with a different standard than DLNA (a device complying with the audio signal radio transmission technology).

(2) A device complying with the audio signal radio transmission technology can perform an operation such as reproduction on a DMR without performing through a DMC.

(3) A device complying with the audio signal radio transmission technology can be identified as if the device were an IP device. Specifically, normally, since the audio signal radio transmission technology is a unique standard, a device complying with this technology is not recognized as an IP device. On the other hand, a device complying with DLNA can be identified as an IP device because DLNA is based on the IP protocol. According to the embodiment of the present invention, by establishing a connection between a data converting unit 111 and a content receiving apparatus 20 in a one-to-one correspondence manner, the content receiving apparatus 20 linked to the data converting unit 111 can be identified as if the content receiving apparatus 20 were an IP device.

It should be understood by those skilled in the art that various modifications, combinations, sub-combinations and alterations may occur depending on design requirements and other factors insofar as they are within the scope of the appended claims or the equivalents thereof.

Although in the above-described embodiment the audio signal radio transmission technology is described as an example of a technology having a communication standard different than DLNA, the present invention is not limited to such an example.

The present application contains subject matter related to that disclosed in Japanese Priority Patent Application JP 2009-047005 filed in the Japan Patent Office on Feb. 27, 2009, the entire content of which is hereby incorporated by reference.

What is claimed is:

1. A content reproduction apparatus comprising:
a reproduction request receiving unit to receive from a first external device conforming to a first communication standard a request to reproduce content data selected by the first external device;
a content data obtaining unit to obtain from a second external device conforming to the first communication standard the content data in response to the request received by the reproduction request receiving unit, the second external device storing the content data selected by the first external device;
a content reproduction unit to reproduce the content data obtained by the content data obtaining unit;
a plurality of data converting units to convert data which can be transmitted according to the first communication standard into data which can be transmitted according to a second communication standard different than the first communication standard; and
a converted data transmitting unit to transmit the data which is converted by a data converting unit of the plurality of data converting units and can be transmitted according to the second communication standard to a third external device conforming to the second communication standard,
wherein each of the plurality of data converting units receives data from one of a plurality of third external devices which are different from each other, and
wherein each of the plurality of data converting units can perform data transmission with one or more other data converting units.

2. The content reproduction apparatus according to claim 1, wherein
when the data converting unit of the plurality of data converting units receives from the third external device a processing instruction signal for causing the content reproduction apparatus to perform a predetermined processing, the data converting unit converts the processing instruction signal into a signal that can be transmitted according to the first communication standard and outputs the signal to the content reproduction unit, and
the content reproduction unit performs the predetermined processing based on the converted processing instruction signal.

3. The content reproduction apparatus according to claim 1, wherein
the second communication standard realizes data transmission by radio communication with a 2.4 GHz-band between devices which can communicate according to the second communication standard using a plurality of channels which are paths for transmitting data including audio signals.

4. The content reproduction apparatus according to claim 3, wherein
the data converting unit of the plurality of data converting units receives from the first external device a sound volume control signal for adjusting reproduction sound volume of the content data on the third external device, converts the received sound volume control signal, and outputs the converted sound volume control signal to the converted data transmitting unit, and
the converted data transmitting unit transmits the converted sound volume control signal to the third external device.

5. The content reproduction apparatus according to claim 3, wherein
the data converting unit of the plurality of data converting units determines whether the transmission of the content data is performed using either a first data transmission scheme, according to which the audio signals of different sound source types are transmitted on each of the plurality of channels, or a second data transmission scheme, according to which the audio signals of a same sound source type are transmitted on each of the plurality of channels.

6. A content receiving apparatus comprising:
a content data obtaining unit to obtain content data, being reproduced on a second external device based on control by a first external device conforming to a first communication standard, from the second external device by communication according to a second communication standard different than the first communication standard;
a content reproduction unit to reproduce the content data obtained by the content data obtaining unit; and
a plurality of data converting units, wherein each data converting unit of the plurality of data converting units receives data from an external device and performs data transmission with at least one other data converting unit.

7. The content receiving apparatus according to claim 6, further comprising:
a processing instruction signal generating unit to generate a processing instruction signal for causing the second external device to perform a predetermined processing; and
a processing instruction signal transmitting unit to transmit the processing instruction signal generated by the processing instruction signal generating unit to the second external device as a signal conforming to the second communication standard.

8. The content receiving apparatus according to claim 6, wherein
the second communication standard realizes the data transmission by radio communication with a 2.4 GHz-band between devices which can communicate according to the second communication standard using a plurality of channels which are paths for transmitting data including audio signals.

9. The content receiving apparatus according to claim 8, further comprising:
a control signal receiving unit to receive, when a sound volume control signal for adjusting reproduction sound volume of the content data on the content receiving apparatus is transmitted from the first external device to the second external device as data which can be transmitted according to the first communication standard, the sound volume control signal which is converted by the second external device into data which can be transmitted according to the second communication standard,
wherein the content reproduction unit adjusts the reproduction sound volume of the content data being reproduced, based on the sound volume control signal received by the control signal receiving unit.

10. A method of reproducing content, the method comprising the steps of:
receiving from a first external device conforming to a first communication standard a request to reproduce content data selected by the first external device;
in response to the received request, obtaining the content data from a second external device conforming to the first communication standard that stores the content data selected by the first external device;
reproducing the obtained content data;
using at least one of a plurality of data converting units, converting the content data being reproduced into data which can be transmitted according to a second communication standard different than the first communication standard;
transmitting the converted content data to a third external device conforming to the second communication standard; and
transmitting data between a first data converting unit and a second data converting unit of the plurality of data converting units.

11. A method of reproducing content, according to claim 10:
wherein, when content data being reproduced on a second external device based on control by a first external device conforming to a first communication standard is converted by the second external device into data which can be transmitted according to a second communication standard different than the first communication standard, obtaining the converted content data; and
reproducing the obtained content data.

12. A non-transitory computer readable medium on which is stored a program for causing a computer to implement:
a reproduction request receiving function of receiving from a first external device conforming to a first communication standard a request to reproduce content data selected by the first external device;
a content data obtaining function of obtaining the content data from a second external device conforming to the first communication standard that stores the content data selected by the first external device;
a reproducing function of reproducing the content data obtained by the content data obtaining function;
a data converting function of converting data which can be transmitted according to the first communication standard into data which can be transmitted according to a second communication standard different than the first communication standard; and
a data transmitting function of transmitting data between a first data converting unit and a second data converting unit of a plurality of data converting units.

13. A non-transitory computer readable medium on which is stored a program for causing a computer to implement:
a content data obtaining function of obtaining converted content data when content data being reproduced on a second external device based on control by a first external device conforming to a first communication standard is converted by the second external device into data which can be transmitted according to a second communication standard different than the first communication standard;
a reproducing function of reproducing the content data obtained by the content data obtaining function; and
a data conversion and transmitting function of converting data by at least one of, and transmitting data between two or more of, a plurality of data converting units.

14. A content reproduction system comprising:
a content management server including a storage unit to store predetermined content data and a content data providing unit to provide the content data to an external device conforming to a first communication standard;
a reproduction control apparatus including a content data obtaining unit to obtain a list of the content data managed by the content management server and a reproduction apparatus control unit to request the external device conforming to the first communication standard to reproduce content data selected from the obtained list of the content data;
a content reproduction apparatus including a content data obtaining unit to obtain the content data selected by the reproduction control apparatus from the content management server in response to the request from the reproduction control apparatus a content reproduction unit to reproduce the obtained content data, a plurality of data converting units to convert data which can be transmitted according to the first communication standard into data which can be transmitted according to a second communication standard different than the first communication standard, and a converted data transmitting unit to transmit the data which is converted by the data converting unit and can be transmitted according to the second communication standard to an external device conforming to the second communication standard; and
a content receiving apparatus including a content data obtaining unit to obtain the content data being reproduced by the content reproduction apparatus from the content reproduction apparatus by communication according to the second communication standard and a content reproduction unit to reproduce the content data obtained by the content data obtaining unit;
wherein each of the plurality of data converting units, each data converting unit receives data from an external device and each of the data converting units performs data transmission with at least one other data converting unit.

* * * * *